(12) United States Patent
Anderson et al.

(10) Patent No.: US 12,134,525 B2
(45) Date of Patent: Nov. 5, 2024

(54) SYSTEMS AND METHODS FOR ASSISTING IN OBJECT GRASPING FROM CONTAINERS IN OBJECT PROCESSING SYSTEMS

(71) Applicant: Berkshire Grey Operating Company, Inc., Bedford, MA (US)

(72) Inventors: Bretton Anderson, Westford, MA (US); John Richard Amend, Jr., Belmont, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 51 days.

(21) Appl. No.: 17/742,611

(22) Filed: May 12, 2022

(65) Prior Publication Data
US 2022/0363490 A1 Nov. 17, 2022

Related U.S. Application Data

(60) Provisional application No. 63/187,732, filed on May 12, 2021.

(51) Int. Cl.
*B65G 47/22* (2006.01)
*B65G 13/00* (2006.01)
*B65G 47/82* (2006.01)

(52) U.S. Cl.
CPC ............. *B65G 47/22* (2013.01); *B65G 47/82* (2013.01); *B65G 13/00* (2013.01)

(58) Field of Classification Search
None
See application file for complete search history.

(56) References Cited

U.S. PATENT DOCUMENTS

| 4,067,456 A | * | 1/1978 | Schmitt | B65G 57/24 |
| | | | | 414/794.3 |
| 4,363,589 A | | 12/1982 | Rozwadowski et al. | |

(Continued)

FOREIGN PATENT DOCUMENTS

| CN | 102430530 B2 | 11/2014 |
| CN | 117295672 A  | 12/2023 |

(Continued)

OTHER PUBLICATIONS

Notification of Transmittal of the International Search Report and the Written Opinion of the International Searching Authority, or the Declaration, and the International Search Report and Written Opinion of the International Searching Authority (the European Patent Office) issued in related International Application No. PCT/US2022/028917 on Sep. 5, 2022, 15 pages.

(Continued)

*Primary Examiner* — Kavel Singh
(74) *Attorney, Agent, or Firm* — Gesmer Updegrove LLP

(57) ABSTRACT

A container jostling system for jostling objects within a container is disclosed, where the container is positioned on a conveyor that includes a plurality of rollers that are mutually spaced from one another. The container jostling system includes at least one container contact element that is movable vertically between at least two rollers of the conveyor, and is movable horizontally in a direction that is substantially parallel with the at least two rollers.

36 Claims, 20 Drawing Sheets

(56) References Cited

U.S. PATENT DOCUMENTS

| | | | |
|---|---|---|---|
| 5,145,049 A * | 9/1992 | McClurkin | B65G 47/086 |
| | | | 198/374 |
| 7,399,383 B2 | 7/2008 | Giovinazzo | |
| 9,415,949 B2 | 8/2016 | Buse | |
| 9,643,792 B2 * | 5/2017 | Vetter | B65G 47/244 |
| 10,301,123 B2 | 5/2019 | Itoh et al. | |
| 10,625,432 B2 | 4/2020 | Wagner et al. | |
| 11,046,530 B2 | 6/2021 | Koga | |
| 11,055,504 B2 | 7/2021 | Wagner et al. | |
| 2006/0283688 A1 * | 12/2006 | Blonigan | H01L 21/67709 |
| | | | 198/369.6 |
| 2013/0144431 A1 | 6/2013 | Tidhar et al. | |
| 2017/0267469 A1 | 9/2017 | Miyoshi et al. | |
| 2018/0001353 A1 | 1/2018 | Stockard et al. | |
| 2018/0044120 A1 | 2/2018 | Mäder | |
| 2020/0017314 A1 | 1/2020 | Rose et al. | |
| 2020/0023410 A1 | 1/2020 | Tamura et al. | |
| 2020/0346790 A1 | 11/2020 | Prakken et al. | |
| 2022/0032463 A1 | 2/2022 | Schneider et al. | |
| 2022/0041383 A1 | 2/2022 | Krishnamoorthy et al. | |
| 2022/0135347 A1 | 5/2022 | Cohen et al. | |
| 2022/0144561 A1 | 5/2022 | Geyer et al. | |
| 2023/0105141 A1 | 4/2023 | Allen et al. | |

FOREIGN PATENT DOCUMENTS

| | | |
|---|---|---|
| DE | 2516507 A1 | 10/1976 |
| JP | S5943718 A | 3/1984 |
| NL | 2011493 C2 | 3/2015 |
| WO | 2020147851 A1 | 7/2020 |
| WO | 2022241079 A1 | 11/2022 |

OTHER PUBLICATIONS

Communication pursuant to Rules 161(1) and 162 EPC issued by the European Patent Office in related European Patent Application No. 22726962.8 on Dec. 19, 2023, 3 pages.

International Preliminary Report on Patentability issued by the International Bureau of WIPO in related international application No. PCT/US2022/028917 on Nov. 14, 2023, 8 pages.

\* cited by examiner

SYSTEMS AND METHODS FOR ASSISTING IN OBJECT GRASPING FROM CONTAINERS IN OBJECT PROCESSING SYSTEMS

PRIORITY

The present application claims priority to U.S. Provisional Patent Application Ser. No. 63/187,732, filed May 12, 2021, the disclosure of which is hereby incorporated by reference in its entirety.

BACKGROUND

The invention generally relates to object processing systems and relates in particular to object processing systems such as automated storage and retrieval systems, distribution center systems, and sortation systems that are used for processing a variety of objects.

Current object processing systems generally involve the processing of a large number of objects, where the objects are received in either organized or disorganized batches and must be routed to desired destinations in accordance with a manifest, or specific addresses on the objects (e.g., in a mailing system).

Automated storage and retrieval systems (AS/RS), for example, generally include computer-controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

Current distribution center sorting systems, for example, generally assume an inflexible sequence of operations whereby a disorganized stream of input objects is first singulated into a single stream of isolated objects presented one at a time to a scanner that identifies the object. A programmable motion device such as a robot, may grasp objects, e.g., from a box, bin or tote, one at a time for processing or passage to an induction element (e.g., a conveyor, a tilt tray, or manually movable bins) that transport the objects to a desired destination for further processing station.

In typical parcel sortation systems, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Current state-of-the-art sortation systems rely on human labor to some extent. Most solutions rely on a worker that is performing sortation, by scanning an object from an induction area (chute, table, etc.) and placing the object in a staging location, conveyor, or collection bin. In a system that uses a programmable motion device, such as a robot with an end-effector for grasping objects, the objects are not always presented to the programmable motion device in positions or orientations that are most conducive to rapid grasping and processing by the programmable motion device. Human labor, again, may be needed to assist in better presenting the object(s) to the programmable motion device.

There remains a need for more efficient and more cost-effective object processing systems that process objects of a variety of sizes and weights into appropriate collection bins or boxes yet is efficient in handling objects of such varying sizes and weights.

SUMMARY

In accordance with an aspect, the invention provides a container jostling system for jostling objects within a container, where the container is positioned on a conveyor that includes a plurality of rollers that are mutually spaced from one another. The container jostling system includes at least one container contact element that is movable vertically between at least two rollers of the conveyor and is movable horizontally in a direction that is substantially parallel with the at least two rollers.

In accordance with another aspect, the invention provides an object processing system including a programmable motion device for accessing objects within a container on a conveyor. The object processing system includes at least one container contact element that is movable vertically between at least two portions of the conveyor, and an actuator for actuating the at least one contact element in a direction that is substantially transverse with the direction of vertical movement.

In accordance with a further aspect, the invention provides a method of jostling at least one object in a container on a conveyor. The method includes moving at least one container contact element vertically between at least two portions of the conveyor and actuating an actuator to move the at least one contact element in a direction that is substantially transverse with the direction of vertical movement.

BRIEF DESCRIPTION OF THE DRAWINGS

The following description may be further understood with reference to the accompanying drawings in which.

The drawings are shown for illustrative purposes only.

DETAILED DESCRIPTION

In accordance with an aspect, the invention provides a container jostling system for jostling objects within a container, where the container is positioned on a conveyor that includes a plurality of rollers that are mutually spaced from one another. The container jostling system includes one or more container contact elements that are movable vertically between rollers of the conveyor, and are movable horizontally in a direction that is substantially parallel with the at least two rollers by, for example, rotational or linear motion.

It has been discovered that in certain applications, one or more objects in a container (e.g., a box, bin or tote etc.) may be positioned within the container such that an end-effector of a programmable motion device (e.g., a robot gripper) may have difficulty grasping or be unable to grasp the object(s). Additionally, one or more perception systems (such as cameras) that are positioned near the container may have difficulty viewing or be unable to view the object(s) depending on the position of the object(s) in the container. It has further been discovered that a jostling system may be provided that may be installed within a pick system that will move items within a container such that the object(s) may be better viewed and/or grasped. The object(s) are generally moved towards the center of the container where they are more easily reached by the robot gripper. In accordance with certain aspects, it is desirable to locate this feature within the picking zone, such that picking attempts can be made between jostling adjustments.

Figure 1:
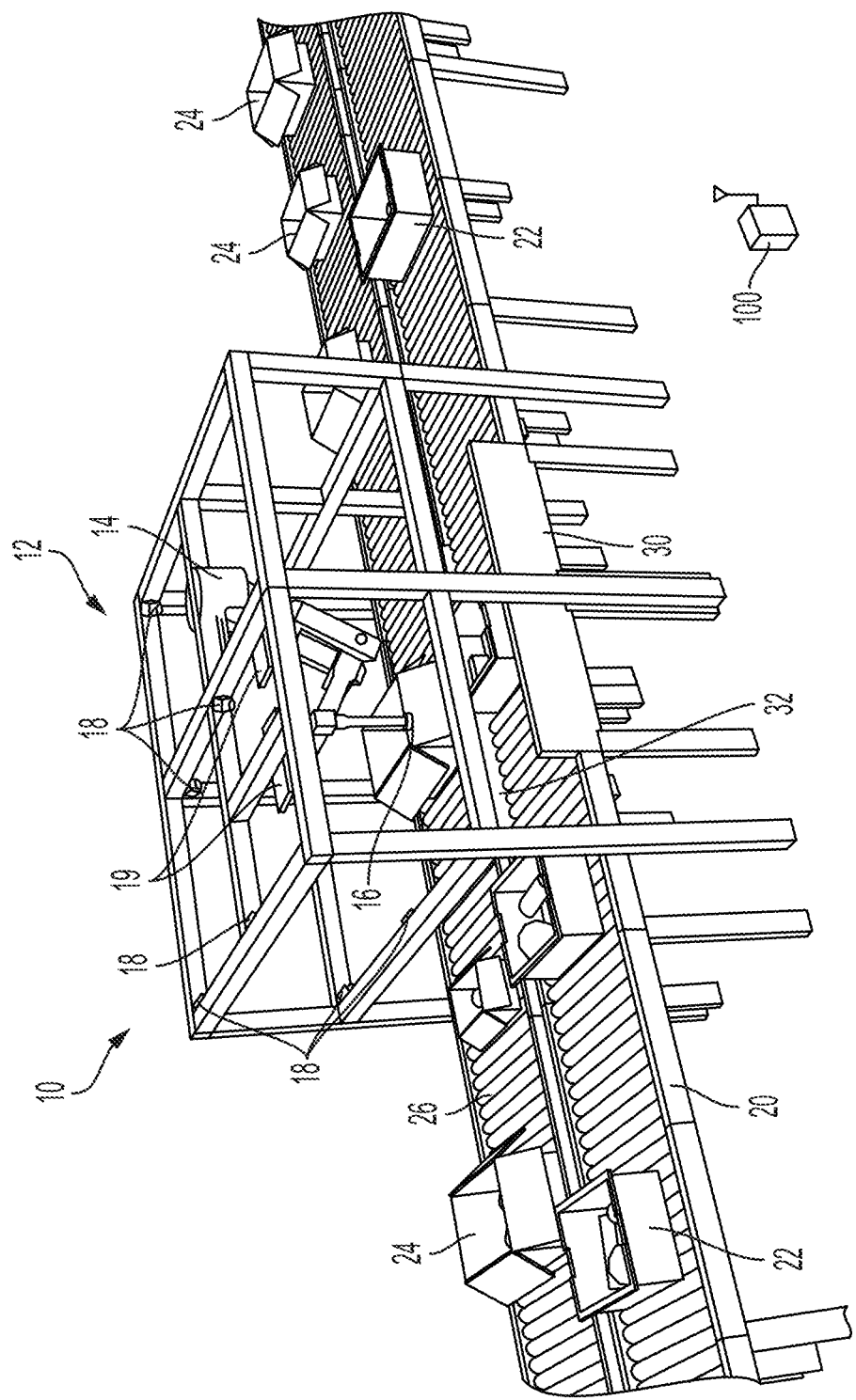
FIG. 1 shows an illustrative diagrammatic view of an object processing system including a container jostling system in accordance with an aspect of the present invention.

FIG. 1 for example, shows a system 10 in accordance with an aspect of the present invention. The system 10 includes a processing station 12 with a programmable motion device (e.g., an articulated arm) 14 with an end-effector 16, as well as a plurality of perception units 18, 19. Perception units 19 may be positioned over an infeed conveyor 20 on which infeed containers (e.g., totes) 22 of objects are provided. Generally, the processing station 12 uses the end-effector 16 of the programmable motion device 14 to move objects into output containers (e.g., boxes) 24 of an output conveyor 26. The system also includes a container jostling system (as discussed in more detail below) that includes brace walls 30, 32. Operation of the system (including conveyors, the programmable motion device, perception units and the container jostling system) may be controlled by one or more computer processing systems 100.

Figure 2:
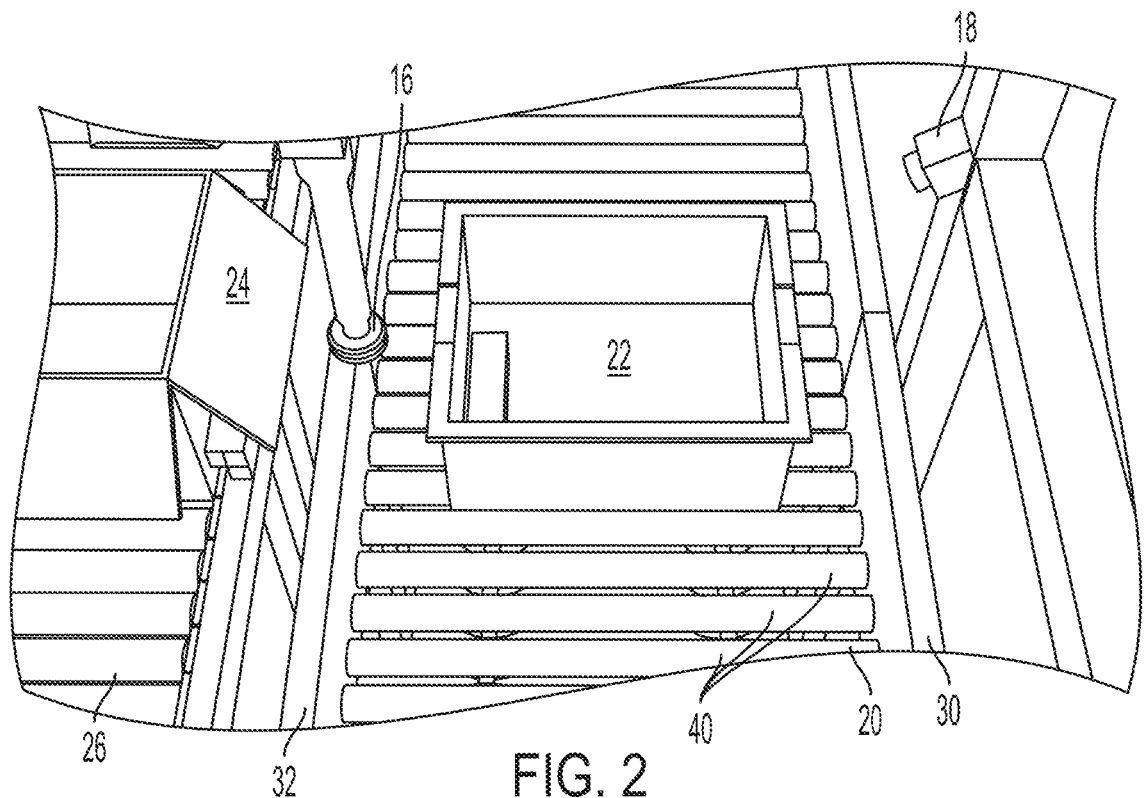
FIG. 2 shows an illustrative diagrammatic upper elevational view of the container jostling system of FIG. 1 with container contact elements not contacting a container.
Figure 3:
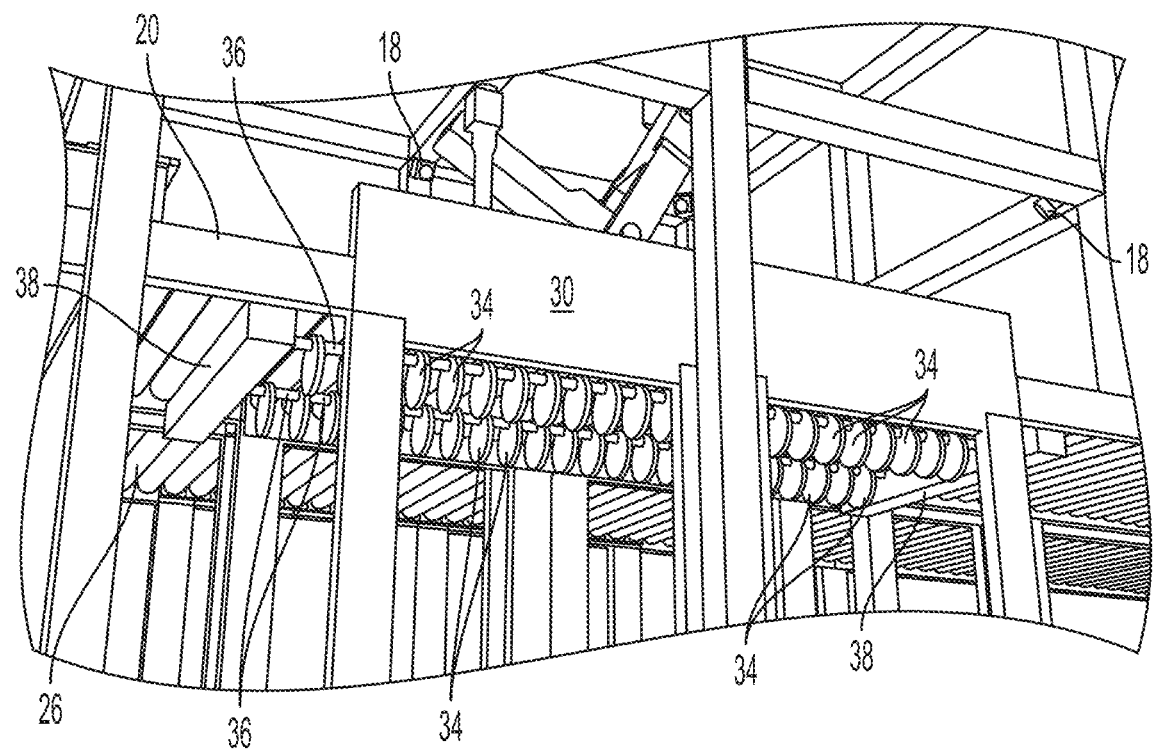
FIG. 3 shows an illustrative diagrammatic lower elevational view of the container jostling system of FIG. 2.
Figure 4:
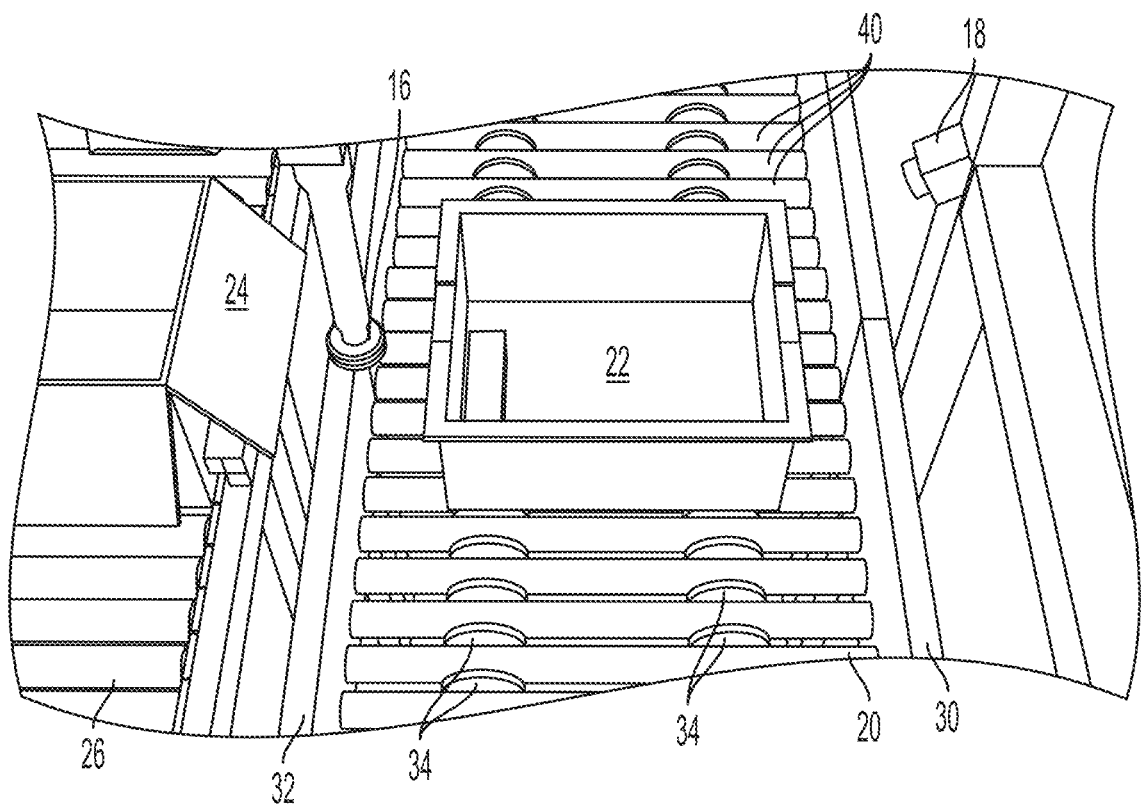
FIG. 4 shows an illustrative diagrammatic upper elevational view of the container jostling system of FIG. 1 with container contact elements contacting the container.
Figure 5:
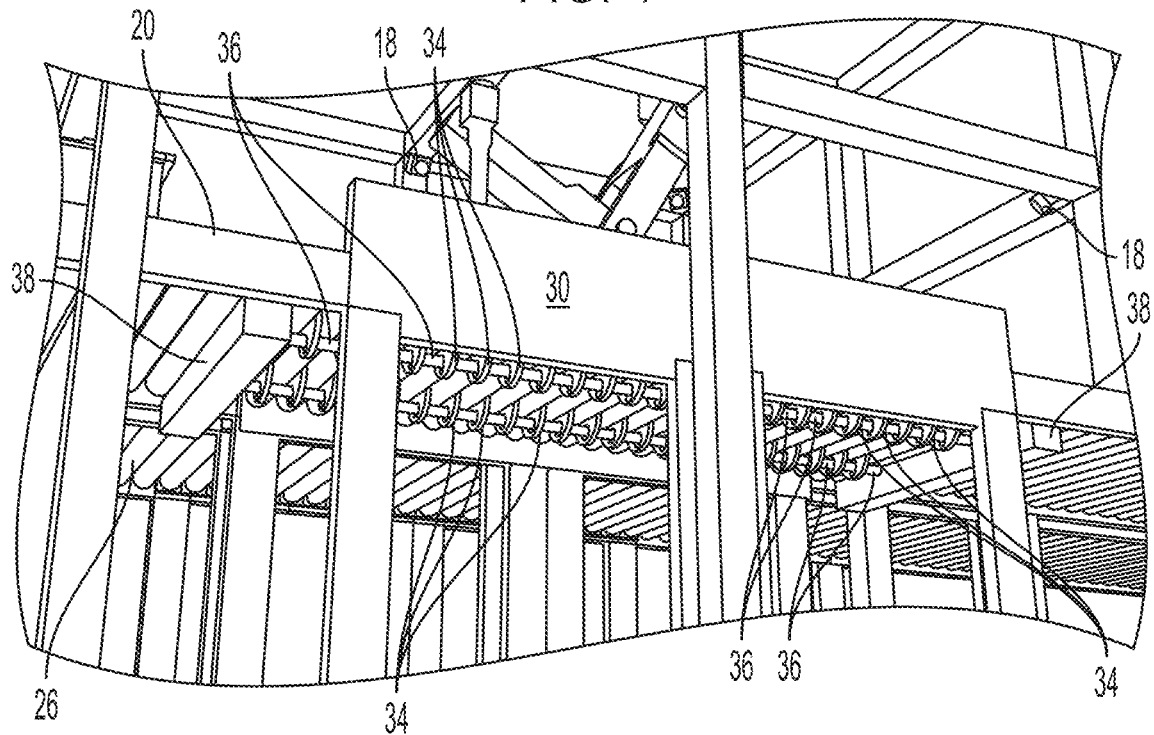
FIG. 5 shows an illustrative diagrammatic lower elevational view of the container jostling system of FIG. 4.

With further reference to FIGS. 2 and 3, the container jostling system further includes a plurality of paddles 34 that are rotatably mounted on one or more drive shafts 36 below the conveyor 20 such that when actuated (by actuating motors 38), cause the paddles to be rotated. FIG. 2 shows a view above the conveyor 20, while FIG. 3 shows a view below the conveyor, both with the paddles in a non-engaged, downward facing position. When the paddles are rotated, they emerge between the rollers 40 of the conveyor, and with reference to FIGS. 4 and 5, their highest area sits above the rollers 40 when rotated upward. FIG. 4 shows a view above the conveyor 20, while FIG. 5 shows a view below the conveyor, both with the paddles in an engaged, upward facing position.

Figure 6A:
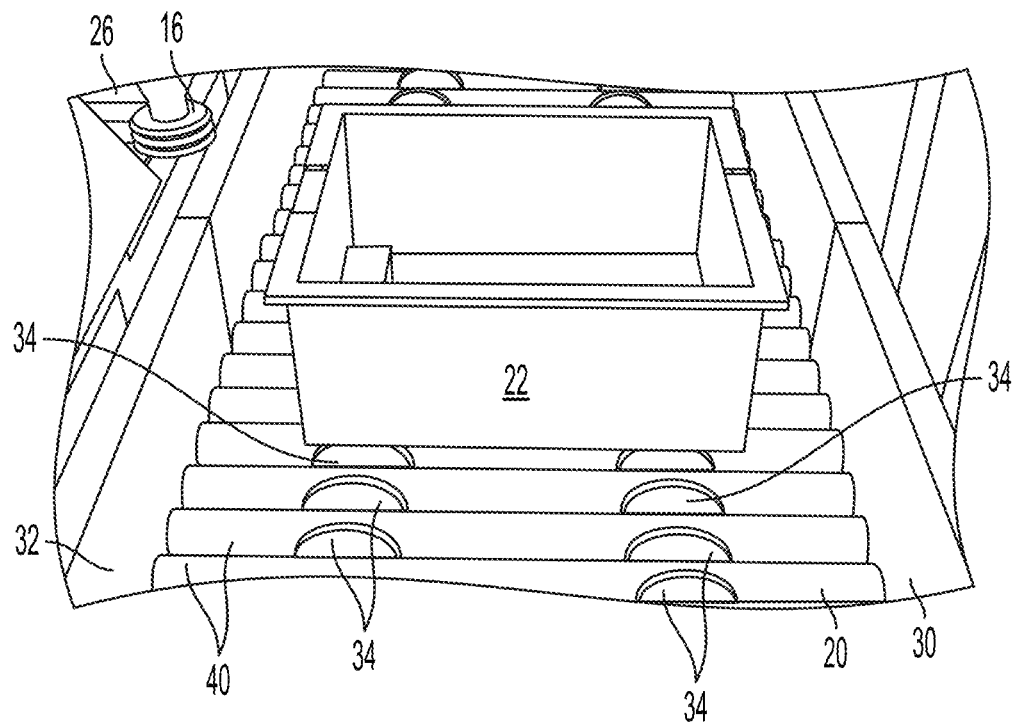
FIGS. 6A-6C show illustrative diagrammatic views of container contact elements contacting a container (FIG. 6A), moving the container in a first direction (FIG. 6B) and moving the container in a second direction opposite the first direction (FIG. 6C)
Figure 6B:
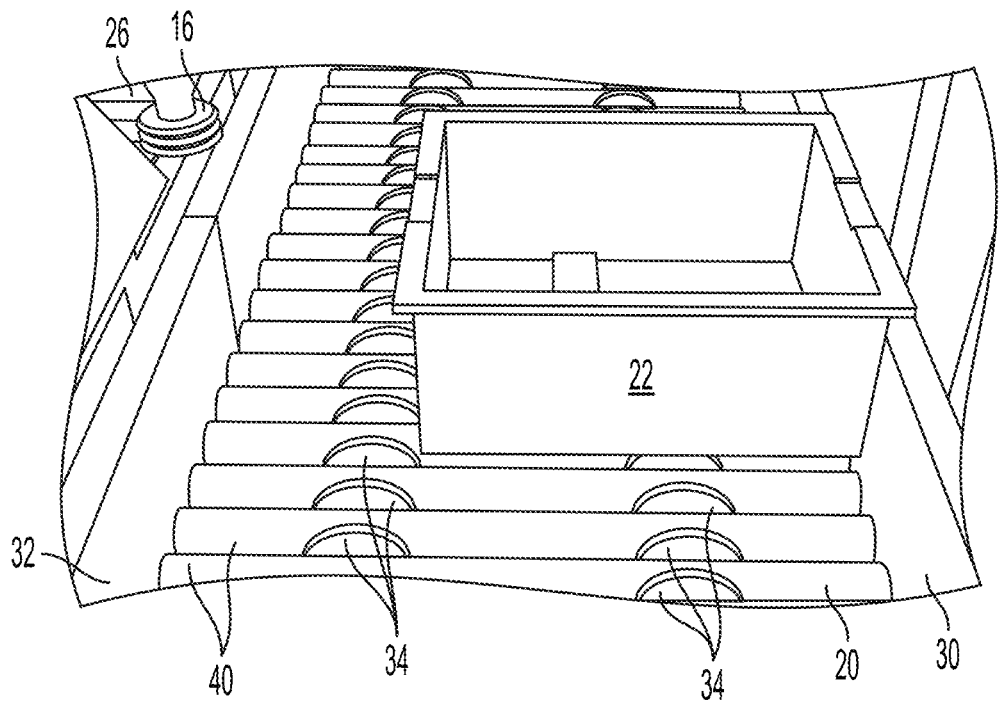
Figure 6C:
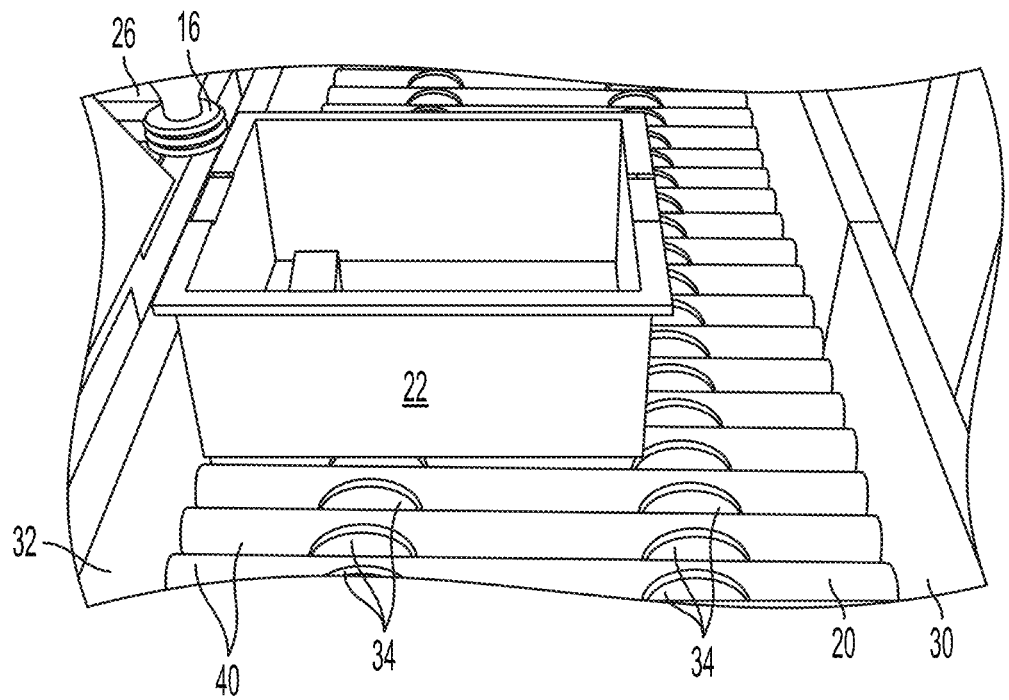

With further reference to FIG. 6A, when the paddles 34 are rotated such that at least portions of the paddles are above the rollers 40, a container 22 on the conveyor 20 above the paddles is lifted slightly by the paddles. The paddles 34 may then be rotated quickly (or continue to be rotated quickly) in a direction (clockwise as shown in FIG. 6B) to cause the container 22 including any object(s) therein to slam against the brace wall 30 as shown in FIG. 6B causing any object(s) therein to travel toward the central region of the container 22. Alternately, the paddles 34 may be rotated quickly (or continue to be rotated quickly) in a direction (counterclockwise as shown in FIG. 6C) to cause the container 22 including any object(s) therein to slam against the brace wall 32 as shown in FIG. 6C causing any object(s) therein to travel toward the central region of the container 22 by bouncing off of the inner container wall closest to the brace wall 32. Such a process of moving the container against a brace wall closer to the object to be moved may be desired, for example, if there are other objects in the container between the object to be moved and an opposite inner container wall. The paddles may be coated or include a covering of, for example, a rubber or polyurethane material to facilitate engagement with the underside of the container.

Figure 7:
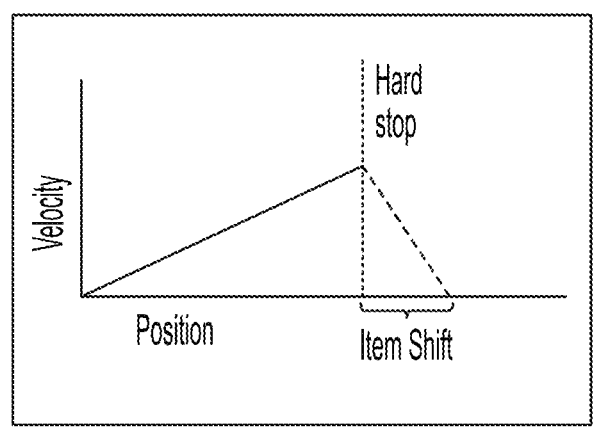
FIG. 7 shows an illustrative graphical representation of velocity and position of an object in a container when the container hits a hard stop.

The approach, therefore, is to move the container in a way that the contents of the container will move towards the center area of the container, either directly or by bouncing off of a container inner wall. The vision system may determine which portion of the container has an object needing to be repositioned. Using this information, the software may determine which motion of the container would be necessary to move, or most effective in moving, the object in the direction needed, and then execute the operation using the container jostling system. It has been determined that the motion profile of the container that may be particularly effective in certain applications at accomplishing this goal, is to accelerate the container at a controlled rate and then stop the container's velocity as quickly as possible by colliding the tote into a hard stop. Through the acceleration phase, the object within the container will have the same velocity as the container, and after impact, the object will slide within the container a given distance, dependent on velocity, and coefficient of friction. FIG. 7 shows a graphical representation of the velocity and position of the container and the item, with respect to the hard stop. The dashed line represents the object sliding on the container floor.

Figure 8:
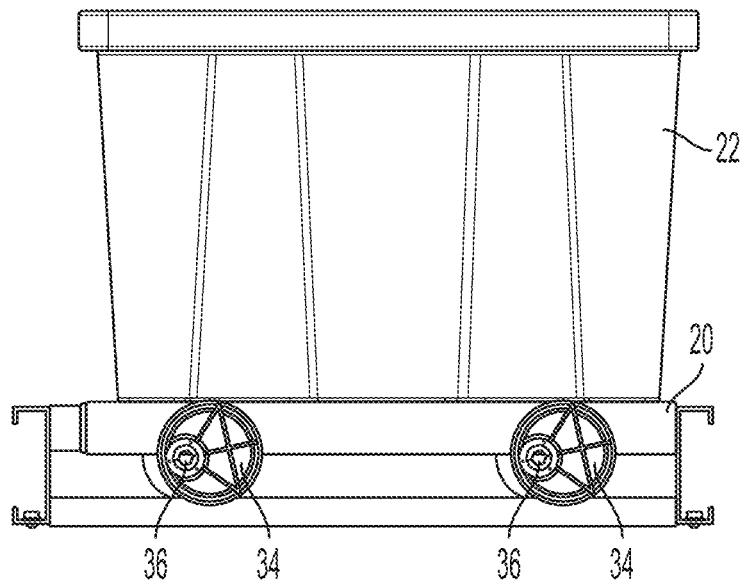
FIG. 8 shows an illustrative diagrammatic front view of a portion of the container jostling system of FIG. 1.

FIG. 8 shows the container 22 on a conveyor with paddles 34 (which herein are round in shape) below the conveyor rotated just to the point of contact with the underside of the conveyor. The paddles 34 include polygonal-shaped openings 35 and are mounted on complementary polygonal cross-sectional shaped shafts 36, e.g., having a polygonal shape of a hexagon as further shown in FIG. 10A. A method, therefore, of accelerating a container laterally is to use such eccentric cams to lift and move the tote. In FIG. 8, the cams sit staggered between the rollers of a conveyor. Each shaft is linked together by a synchronous timing belt, chain or gears so that they rotate at the same rate. The home position is when the paddles are at the bottom of the cycle. By rotating one revolution to either CW or CCW, the container will be lifted and translated (e.g., one step or urged into a slide) By placing a hard stop in a location such that the container will collide with the hard stop while at its maximum lateral velocity, the object shift will occur.

Figure 9:
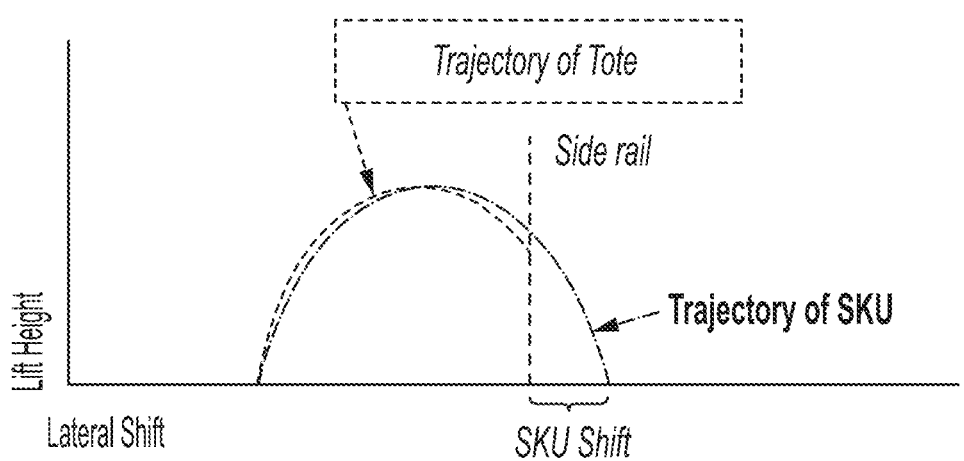
FIG. 9 shows an illustrative graphical representation of lateral shift vs. lift height in a system in accordance with an aspect of the present invention.

The container, therefore, is initially lifted off the conveyor, accelerated upward and to one side (laterally shifted and lifted as shown in FIG. 9). The vertical acceleration increases the friction forces between the item and the container, so objects in the container will accelerate more closely with the container. After top dead center, the container impacts the side rail (hard stop). This stops the lateral motion of the container, but the object(s) should have the same, or similar, lateral velocity as the container at the time of impact as further shown in FIG. 9. At this point in time, the container and object(s) are accelerating downward, so the normal force between them is reduced, and thus, the friction is reduced. The object(s) will continue moving after the container has stopped, coming to rest closer to the center of the container than was the case prior to jostling.

The paddles, therefore, may cause a container to be accelerated as a result of one rotation of the paddles, or in other aspects, the paddles may be rotated a plurality of rotations until the container is urged against a hard stop. The one or more perception systems 18, 19 may also be used to monitor any movement of object(s) in the container, and the paddles may be stopped when sufficient movement within the container is achieved. The object(s) may also undergo sufficient movement without the container reaching the hard stop. The jostling system may also adjust the direction of rotation of the paddles responsive to a location or position of one or more objects within the container. For example, if an object is up against a first (e.g., left) side wall, the system may urge the container against an opposing (e.g., right side) hard stop.

Figures 10A, 10B:
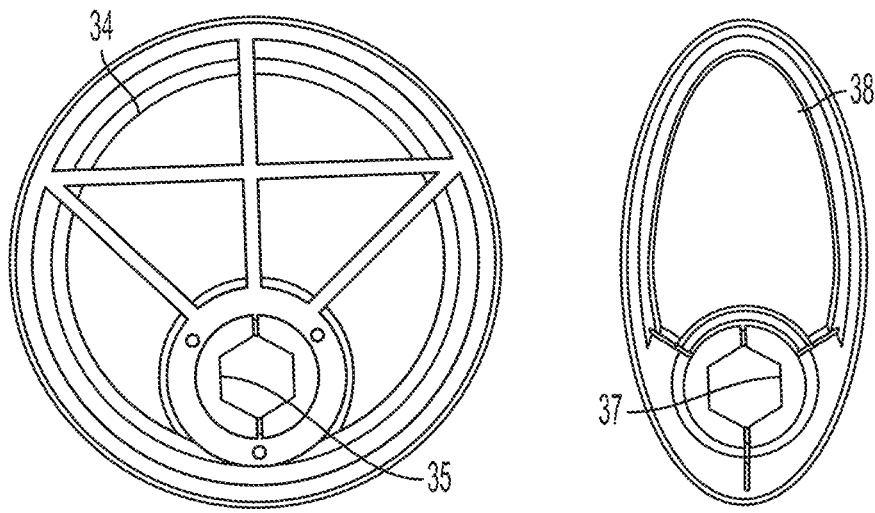
FIGS. 10A and 10B show illustrative diagrammatic front views of different shaped paddles for use in container jostling systems in accordance with aspects of the invention, showing a round shape (FIG. 10A) and an elliptical shape (FIG. 10B)

The paddles therefore, may be eccentrically mounted and round in shape (as shown in FIG. 10A), or may be oval-shaped (as shown at 38 and including a polygonal-shaped opening 37), and either eccentrically mounted (as shown in FIG. 10B) or centrically mounted if the paddles are large enough to accommodate having a mounting shaft below the conveyor rollers. Additionally, the mounting (to a rotating shaft) may be by way of a shaped opening (e.g., hexagonally-shaped as shown in FIGS. 10A and 10B) that mates with a similarly shaped (e.g., hexagonally-shaped in cross-section) rotatable drive shaft. The shape of the paddle (e.g., cam) can be adjusted to tune the amount of lift vs shift that will occur. The round paddles will have more lateral movement for the same amount of lifting as compared to the oval-shaped paddles.

Figure 11:
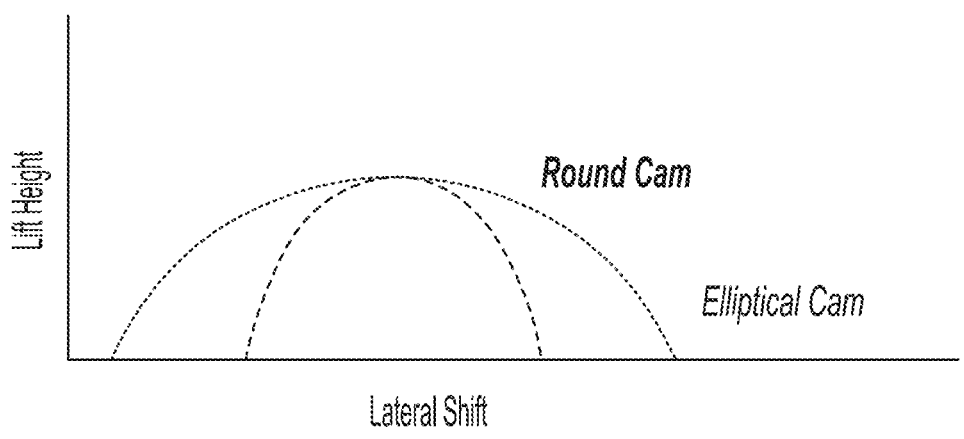
FIG. 11 shows an illustrative graphical representation of lateral shift vs. lift height in a system using the paddles of FIGS. 10A and 10B.

It is intended in an aspect that the motion may be used to shift products from either the left or right equally. In this case, the paddle (e.g., cam) shape is symmetrical and motion may be run either clockwise or counterclockwise. With reference to FIG. 11, the elliptical shaped paddle will provide less horizontal movement for the same vertical movement as compared to the circularly-shaped paddle.

Figure 12A:
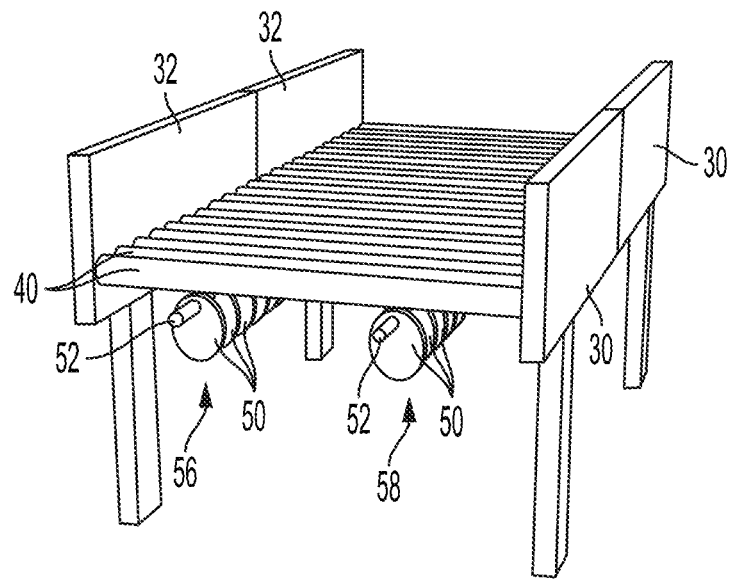
FIGS. 12A-12C show illustrative diagrammatic elevational front views of a container jostling system in accordance with another aspect of the invention with elliptical-shaped paddles in a position not to engage a container (FIG. 12A), a position to just engage a container (FIG. 12B), and a position to move a container (FIG. 12C)
Figure 12B:
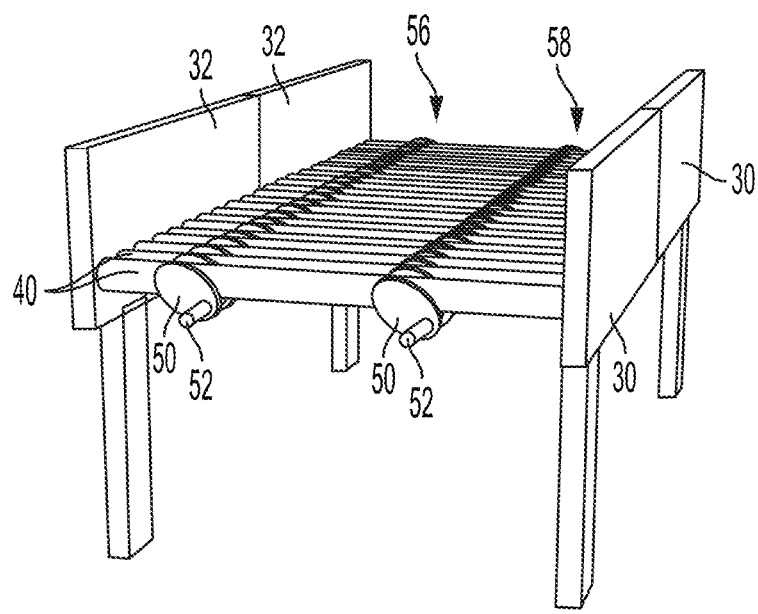
Figure 12C:
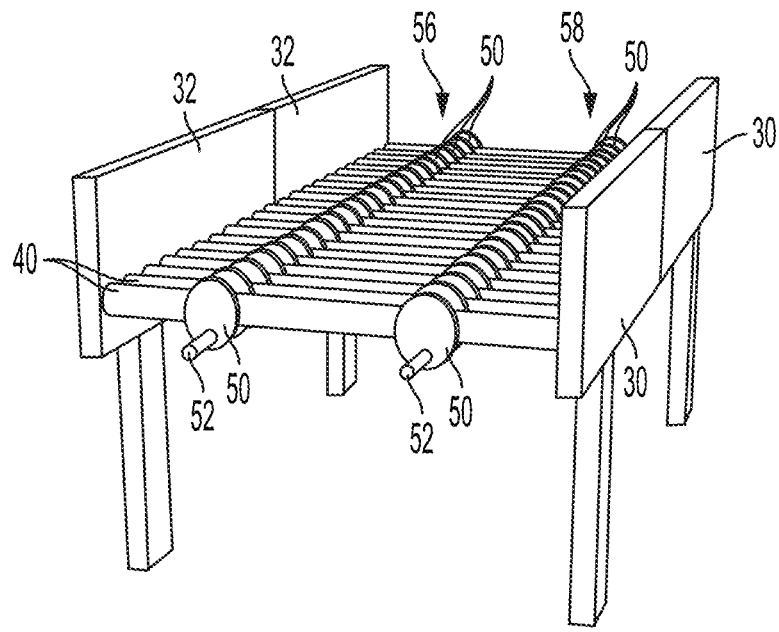

A system may be provided with oval-shaped paddles as shown, for example, in FIGS. 12A-12C. In particular, FIG. 12A shows container jostling system in accordance with a further aspect that includes a plurality of oval-shaped paddles 50 that are rotatably mounted on one or more drive shafts 52 below the conveyor that includes rollers 40 such that when actuated (by actuating motors as discussed above and not shown in FIGS. 12A-12C for clarity), cause the paddles to be rotated. FIG. 12A shows a view with the paddles 50 at home, or rest position, fully downward. When the paddles 50 are rotated, they emerge between the rollers 40 of the conveyor as shown in FIG. 12B, and are positioned above the rollers 40 when rotated upward fully upward as shown in FIG. 12C.

Figure 13:
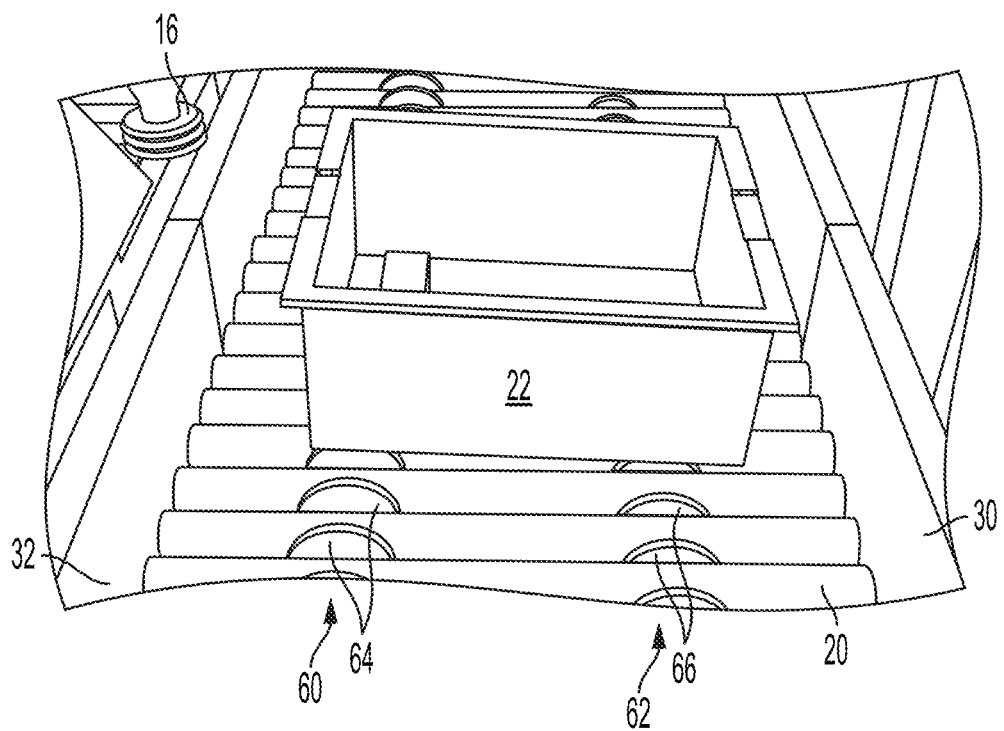
FIG. 13 shows an illustrative diagrammatic elevational front view of a container jostling system in accordance with another aspect of the invention with rows of paddles that rotate with either different rotational velocities or out of phase from one another.

The sets 56, 58 of paddles 50 are shown in FIGS. 12A-12C as having been rotated together. In accordance with a further aspect, one set of paddles may be rotated at a different rotational velocity or out of phase with the other set of paddles. FIG. 13, for example, shows a system in which a first set 60 of paddles 64 are rotated either faster than or out of phase with respect to a second set 62 of paddles 66. Again, when the paddles 64, 66 are rotated such that at least portions of the paddles are above the rollers 40, a container 22 on the conveyor above the paddles is lifted slightly by the paddles, and due to the different rotational position or velocity/phase of the different paddles, the container is lifted such that one side of the container 22 is higher (and potentially lifted earlier) than an opposite side of the container 22. Such a system may permit specialized directional movement that specifically adjusts, for example, an angle θ of incline of the container to reduce (by sin θ) the impact of the weight of an object on the container floor.

Figure 14A:
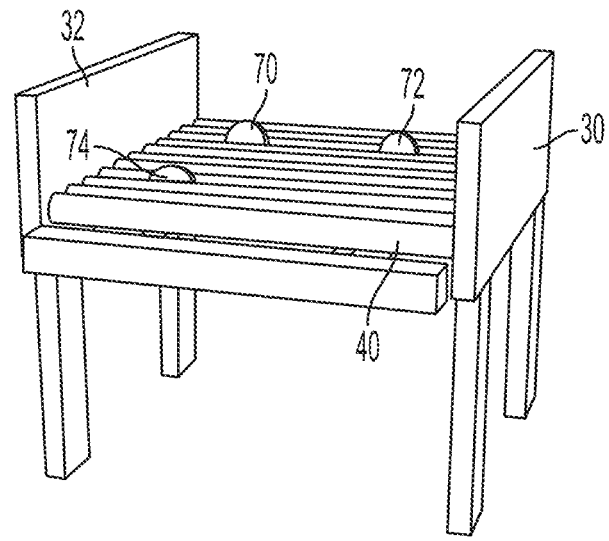
FIGS. 14A and 14B show illustrative diagrammatic views of a container jostling system in accordance with a further aspect of the invention with individual paddles that rotate with either different rotational velocities or out of phase from one another, showing an upper elevational view (FIG. 14A) and a lower elevational view (FIG. 14B)
Figure 14B:
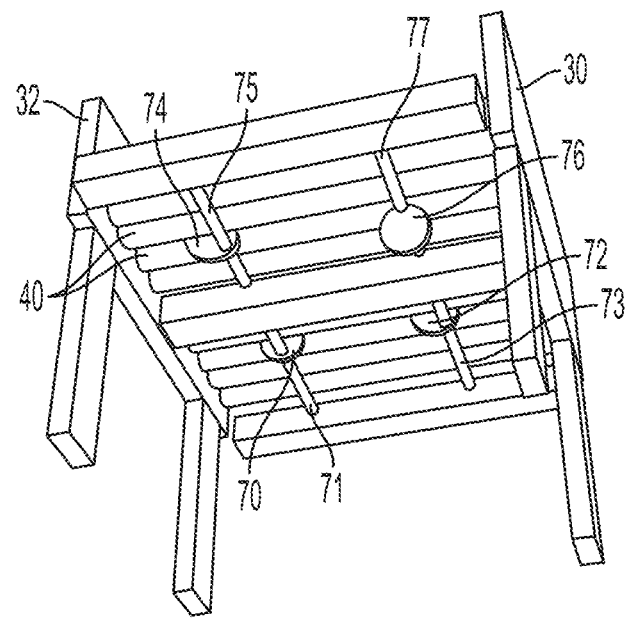

In accordance with yet a further aspect, the paddles (e.g., four) may be rotated on different shafts at different rotational velocities or phases. FIG. 14A, for example, shows from above a system in which paddles 70, 72, 74, 76 are rotated either faster than or out of phase with respect to one another on shafts 71, 73, 75, 77 (shown in FIG. 14B). Again, when the paddles 64, 66 are rotated such that at least portions of the paddles are above the rollers 40, a container 22 on the conveyor above the paddles is lifted slightly by the paddles, and due to the different rotational position or velocity/phase of the different paddles, the container is lifted such that one side and one end (front/back) of the container 22 is higher (and potentially lifted earlier) than an opposite side and end (front/back) of the container 22. Such a system may permit specialized two-dimensional directional movement that specifically adjusts, for example, an angle θ of incline of the container to reduce (by sin θ) the impact of the weight of an object on the container floor in each of side-to-side and front-to-back directions. In such systems, objects lying against a front wall or a back wall may be jostled toward the center of the container with rotational movement of the cams in one direction. The system may therefore effect movement of an object within a container in a combined vector of movement that includes components in the one direction and a second direction that is orthogonal with respect to the one direction.

Figure 15A:
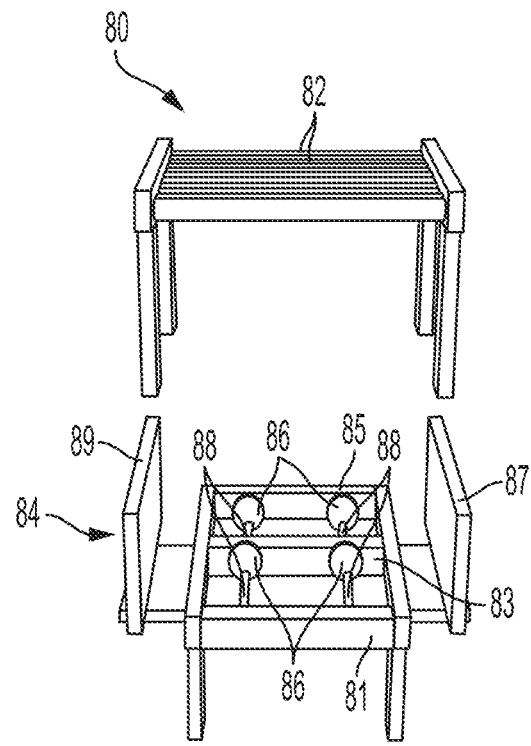
FIGS. 15A and 15B show illustrative diagrammatic views of a container jostling system in accordance with another aspect of the invention with an independently removable conveyor section, showing the container jostling components separated from the conveyor section (FIG. 15A), and combined with the conveyor section (FIG. 15B)
Figure 15B:
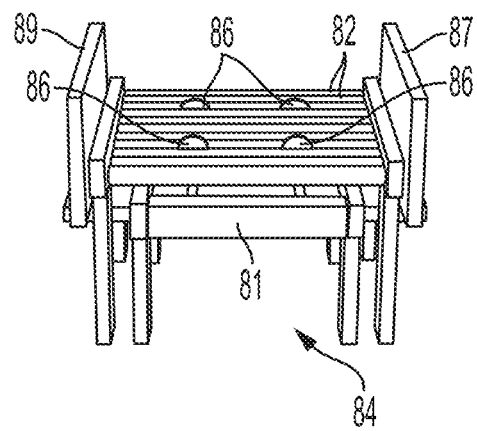

With reference to FIGS. 15A and 15B, a container jostling system in accordance with an aspect may be provided such that it may be readily combined with an existing roller conveyor. In particular, the conveyor 80 may include rollers 82, and the container jostling system 84 may include paddles 86 on shafts 88 coupled to actuators 81, 83, 85 between brace walls 87, 89 as shown in FIG. 15A. As shown in FIG. 15B, jostling system 84 may be positioned under an existing conveyor such that the paddles 86 may be moved between the rollers 82 to engage a container as discussed above. The jostling system 84 may operate as discussed above in accordance with each of the aspects presented above.

Figure 16:
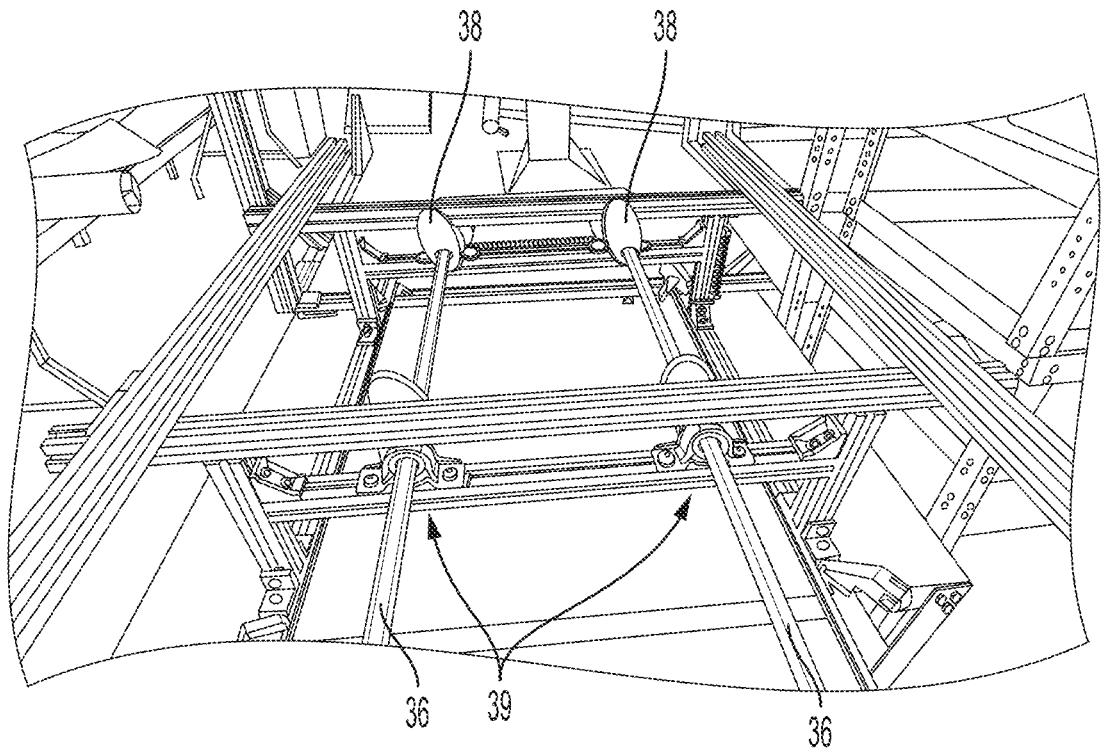
FIG. 16 shows an illustrative diagrammatic view of a manually operated container jostling system for testing purposes in accordance with an aspect of the invention showing hardware for rotationally mounting the paddle drive shafts.
Figure 17:
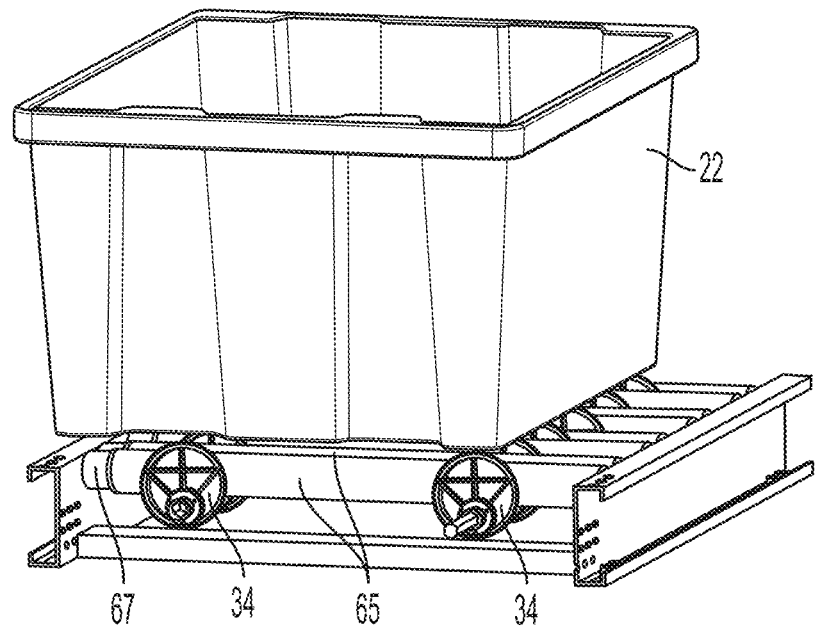
FIG. 17 shows an illustrative diagrammatic view of a container jostling system in accordance with an aspect of the invention showing the polygonal cross sectional-shaped drive shafts.

FIG. 16 shows a prototype that was built using a hand crank to provide motion for viewing corresponding object movement within a container. FIG. 16 shows the paddle shafts 36 mounted to the fixture at rotational mounts 39. Such a prototype may be used to design specific (different) paddle shapes and rotational velocities for different applications. FIG. 17 shows a container 22 on a section of a conveyor that includes a jostling system in accordance with as aspect of the invention that includes rollers 65 mounted on roller actuators 67 for providing actively powered rollers. The jostling system, in accordance with an aspect, should not disturb the actuation of the actively controlled rollers.

Figure 18:
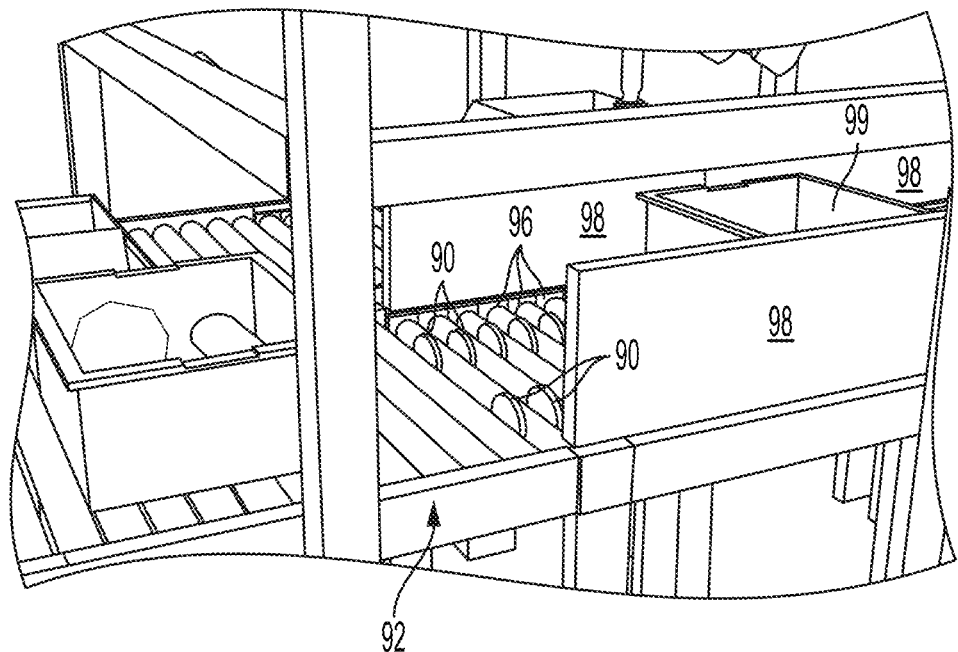
FIG. 18 shows an illustrative side elevational view of a container jostling system in accordance with another aspect of the invention with conveyor rollers mounted on load cells.
Figure 19:
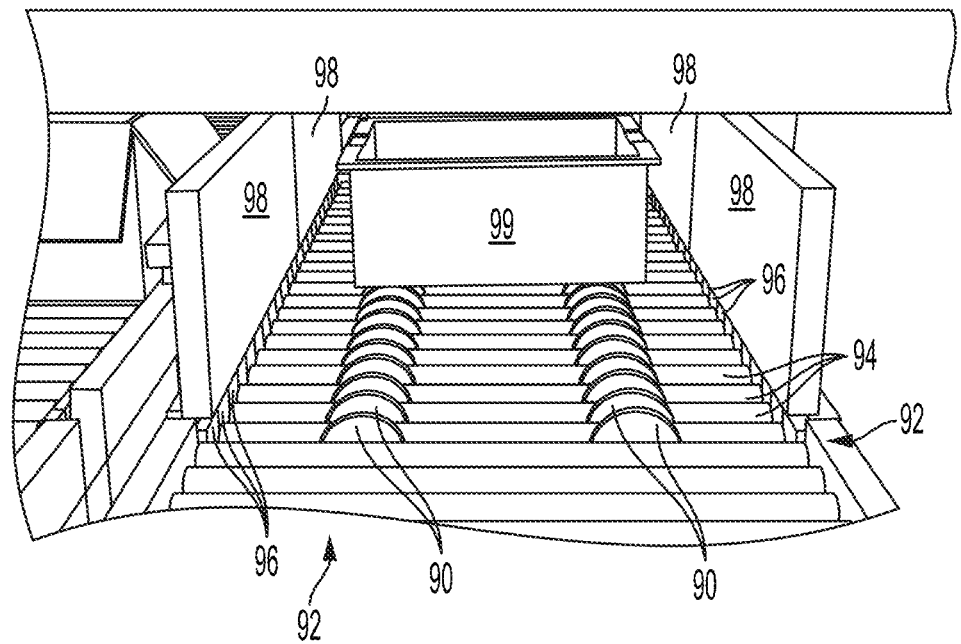
FIG. 19 shows an illustrative front elevational view of the container jostling system of FIG. 18.

In accordance with certain aspects, a container jostling system may be used with a section of conveyor that includes load cells to weigh the container before and after a pick. FIGS. 18 and 19 show a container jostling system in accordance with a further aspect that includes a plurality of paddles 90 that are rotatably mounted on one or more drive shafts below the conveyor 92 such that when actuated (by actuating motors as discussed above), cause the paddles 90 to be rotated. The conveyor rollers 94 are mounted on load cells or force torque sensors 96, and the system includes brace walls 98 against which the container 99 may be urged as discussed above. FIG. 18 shows a view from the side of the conveyor 20, while FIG. 19 shows a view from an end of the conveyor, both with the paddles in an engaged, upward facing position. Again, when the paddles are rotated, they emerge between the rollers 40 of the conveyor. Efforts may be made to ensure the design of the container jostling system does not cause heavy impacts on the weighing conveyor that could cause a failure in calibration of the scales, in part, by ensuring that the container does not directly impact any of the strain gauges or force torque sensors (e.g., by attaching the brace walls to the system structure such that they are isolated from the strain gauges or force torque sensors).

Figure 20:
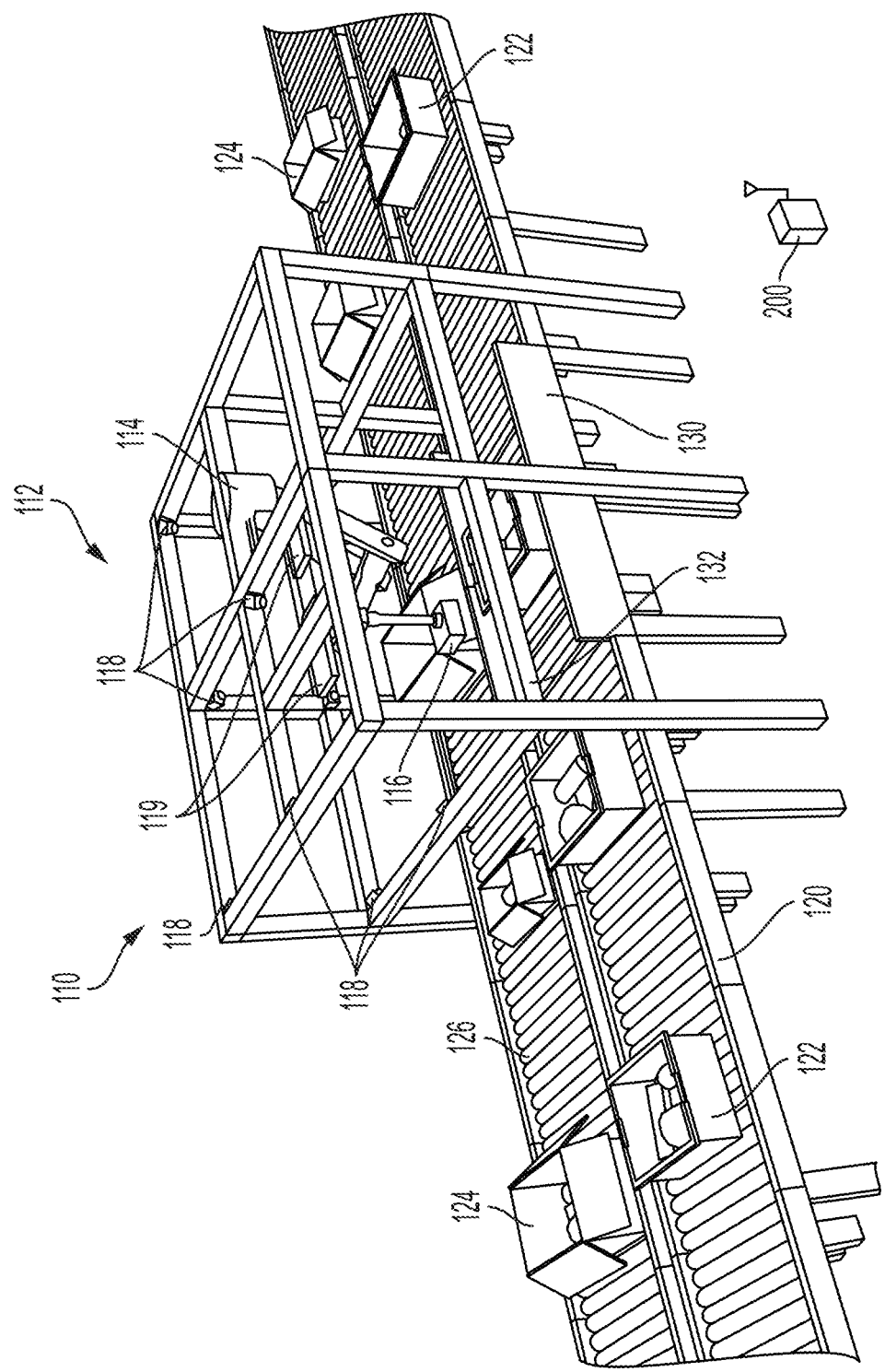
FIG. 20 shows an illustrative diagrammatic view of an object processing system including a container jostling system in accordance with a further aspect of the present invention including belts as container contact elements.

FIG. 20 shows a system 110 in accordance with a further aspect of the present invention that includes a processing station 112 with a programmable motion device (e.g., an articulated arm) 114 with an end-effector 116, as well as a plurality of perception units 118, 119. Perception units 119 may be positioned an infeed conveyor 120 on which infeed containers (e.g., totes) 122 of objects are provided. Generally, the processing station 112 uses the end-effector 116 of the programmable motion device 14 to move objects into output containers (e.g., boxes) 124 of an output conveyor 126. The system also includes a container jostling system (as discussed in more detail below) that includes brace walls 130, 132 and elevatable cross-direction belts 140 that are mounted on elevators 142. Operation of the system (including conveyors, the programmable motion device, perception units and the container jostling system) may be controlled by one or more computer processing systems 200.

Figure 21A:
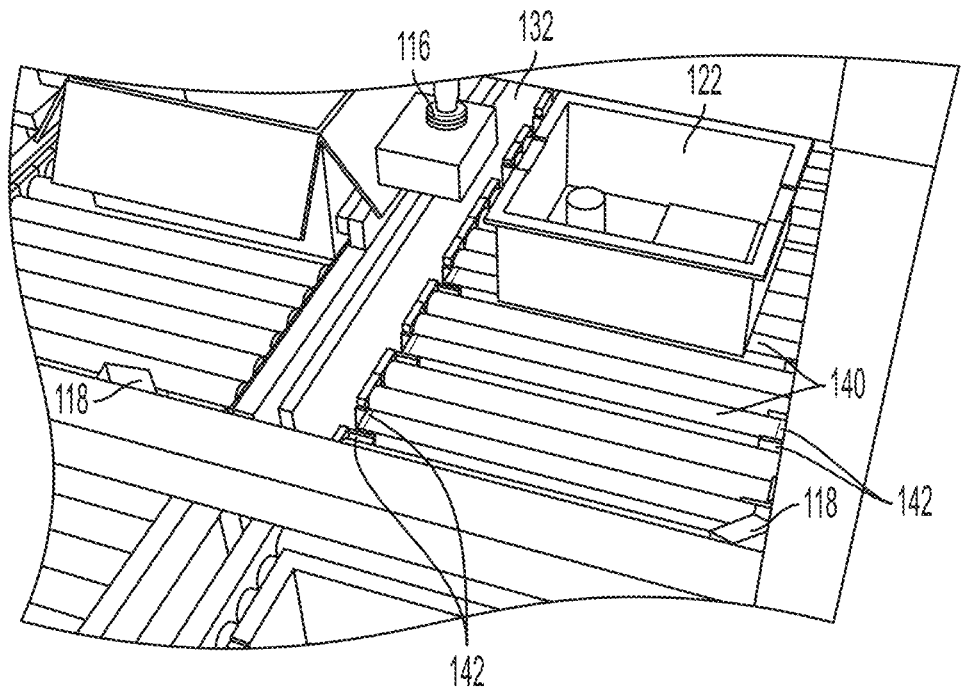
FIGS. 21A and 21B show front elevational views of the object processing system of FIG. 20 with the belts not engaging a container (FIG. 21A) and engaging the container (FIG. 21B)
Figure 21B:
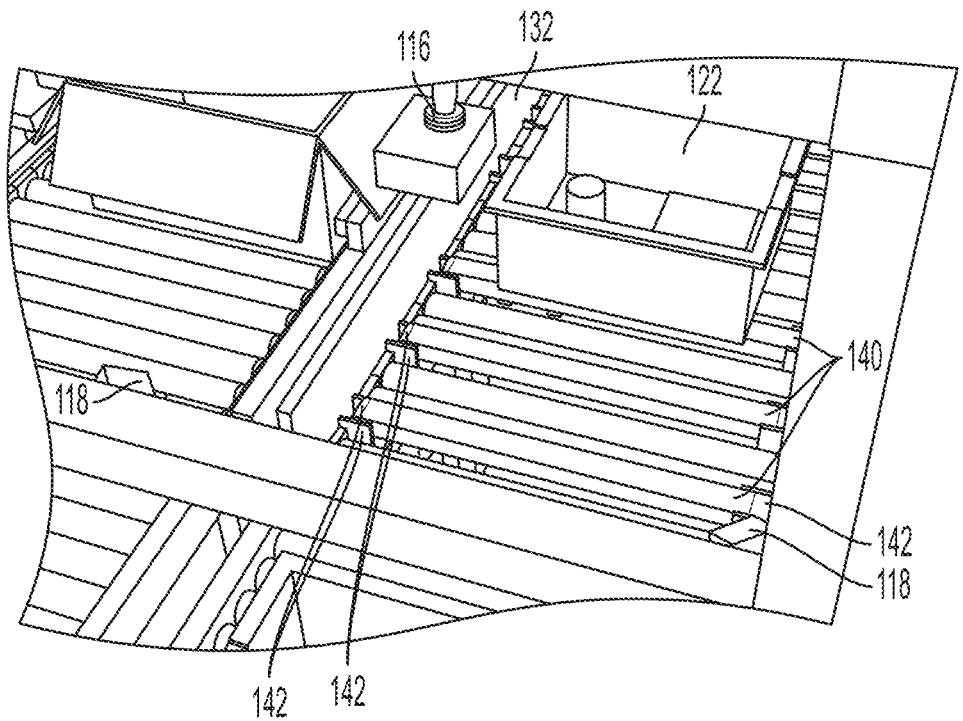

With further reference to FIGS. 21A and 21B, the cross-direction belts 140 are mounted on elevators 142 between rollers 150 of the conveyor 126. FIG. 21A shows the elevators in a lowered position, allowing containers 122 on the conveyor to be supported by the rollers 150 such that they may travel along the length of the conveyor. FIG. 21B shows the elevators 152 (and therefor the belts 150) in an elevated position between the rollers 150 of the conveyor, and when elevated, the bottom of a container 122 becomes supported by the belts 140 rather than the rollers 150.

The belts and elevators may be provided as right-angle transfer station that are employed to direct a container against a brace wall. The right-angle transfer provides approximately the same movements as the cams above, but with two separate actuators. One actuator lifts a series of narrow, parallel belts (the elevators), and the other actuator drives the belts. With this mechanism, the container is lifted and then accelerated laterally into a hard stop placed at a given distance from the start point. As before, this impact causes the container to stop moving and permits the object to continue moving within the container until it stops due to friction. After the jostling movement, the belts return the container to the start point slowly, so as not to jostle in the opposite direction, canceling the results.

Figure 22A:
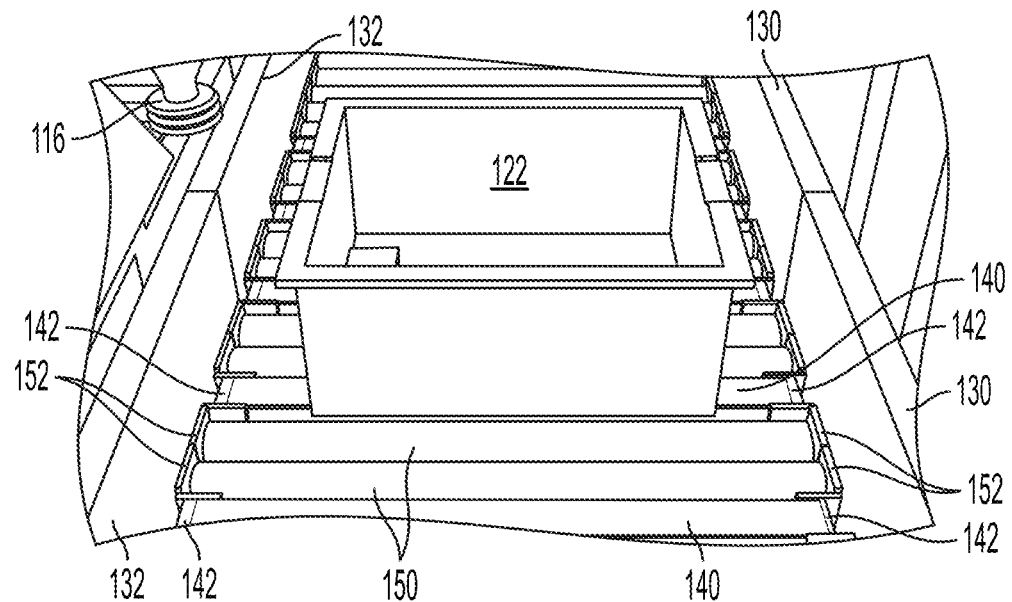
FIGS. 22A-22D show illustrative diagrammatic front elevational views of container contact elements in the form of belts not contacting a container (FIG. 22A), contacting the container (FIG. 22B), moving the container in a first direction (FIG. 22C) and moving the container in a second direction opposite the first direction (FIG. 22D)
Figure 22B:
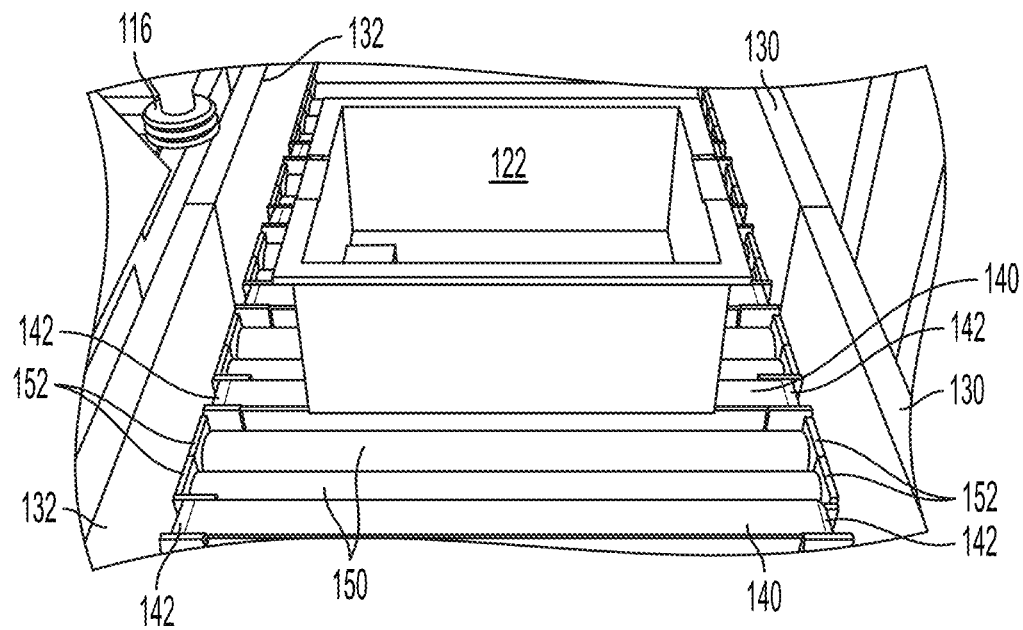
Figure 22C:
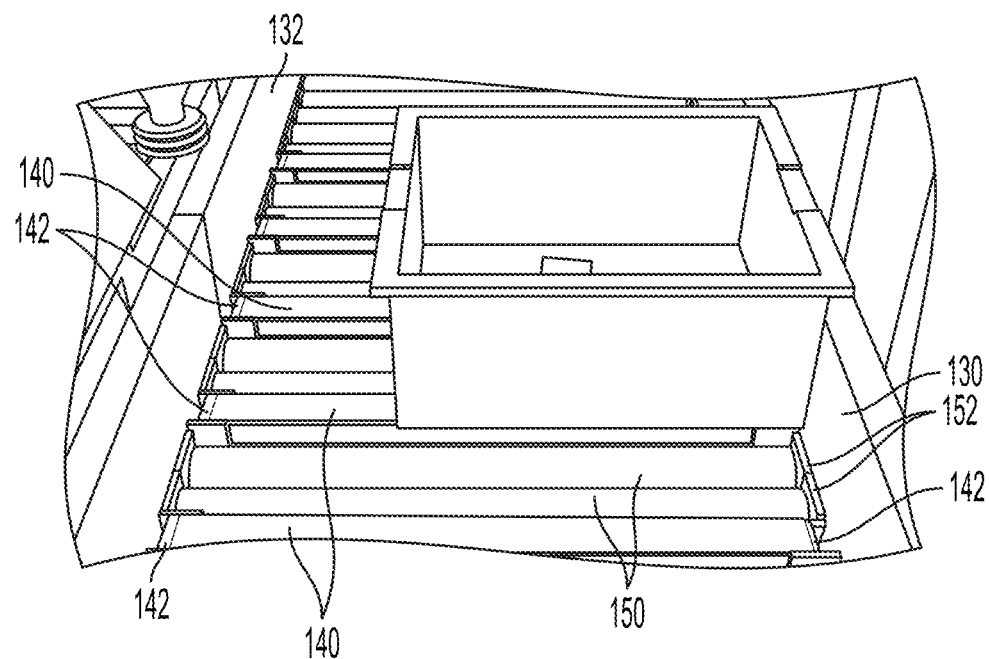
Figure 22D:
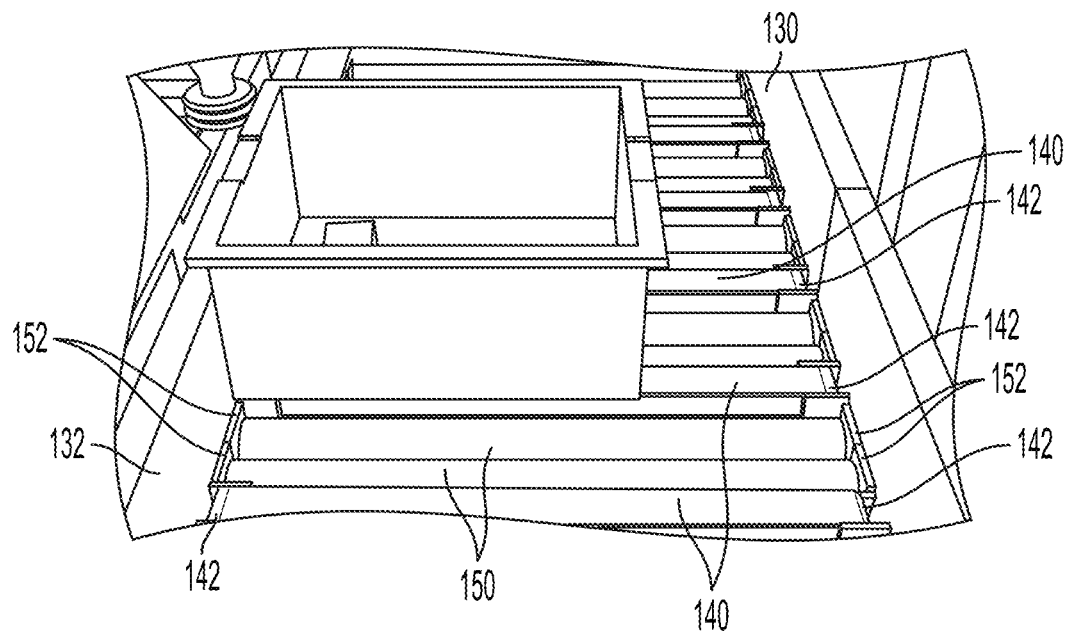
Figure 23:
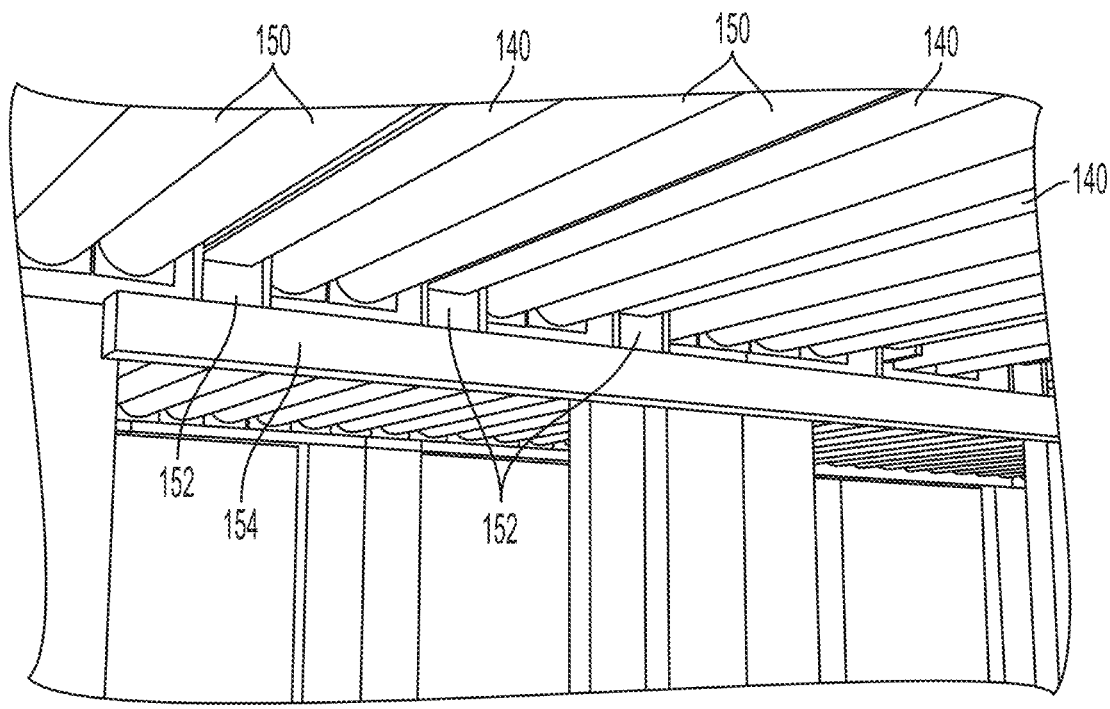
FIG. 23 shows a lower elevational view of the container jostling system in accordance with an aspect of the invention, with belt elevator mounts coupled to common elevator bars.

FIG. 22A shows an enlarged view of the container 122 on the rollers 150, and FIG. 22B shows container 122 in an elevated state on belts 140. FIG. 22C shows the belts causing the container to be urged against the brace wall 130, and FIG. 22D shows the belts causing the container to be urged against the brace wall 132. FIG. 23 shows the underside of the conveyor, showing that the elevator mounts 152 may be coupled to an elevator bar 154 (one each side of the conveyor) for efficient actuation of the elevator system.

In accordance with various aspects, the mode of operation of the system may be as follows. The container arrives on a particular side of the conveyor width (for any of the cam or belt systems). It may be preferred to have the container biased to one side for picking. Following jostling, the container may be (slowly) returned to this position, which may be called a "home position".

Figure 24:
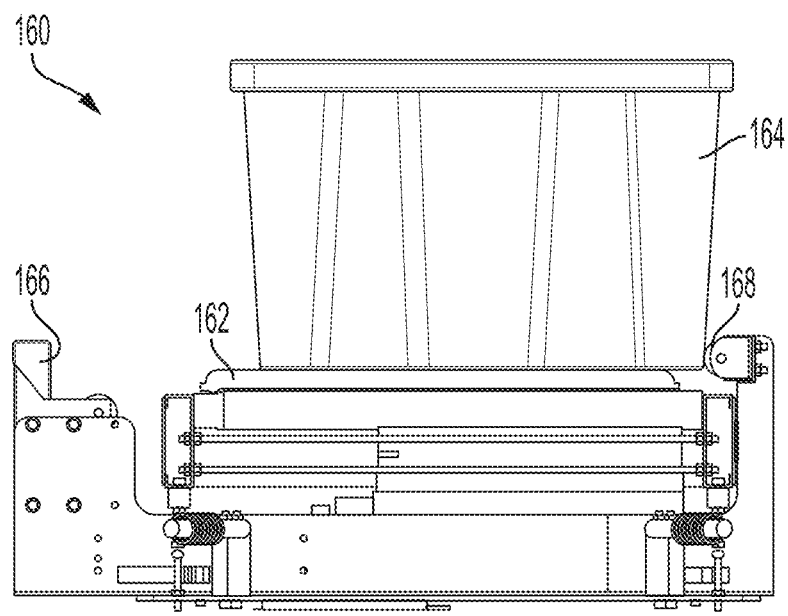
FIG. 24 shows a front view of a container jostling system in accordance with an aspect of the present invention using a right-angle transfer belt system.

If an object is in a right-hand corner of the container (with respect to the image shown in FIG. 24) then the jostling operation will be as follows: Lift the container 164 (e.g., with the right-angle transfer belts 162 as shown or with paddles as discussed above). Accelerate the container 164 to the left After the impact with the hard stop 166, accelerate to a low velocity and bring the tote to hard stop 168 (home position). Lower the right-angle transfer belts (or paddles). If the item is in the left-hand corner (with respect to the image shown), then the jostling operation will be as follows: Lift the paddles or right-angle transfer belts. Accelerate to a low velocity and bring the container to the hard stop 166. Accelerate to a high velocity into hard stop 168, then lower the right-angle transfer belts or paddles.

In accordance with further aspects, where two belts are used, the belts may be driven at different velocities (or even different directions for a short time), to cause movement of an object within a container in a front-back direction in addition to a side-to-side direction (as discussed above with reference to FIGS. 14A and 14B. The system may therefore effect movement of an object within a container in a combined vector of movement that includes components in the one direction of the belts and a second direction that is orthogonal with respect to the one direction.

The above systems involve the use of container jostling systems at the station where a programmable motion device acquires objects. In accordance with further aspects, the container jostling systems may be provided in advance of a picking station as shown with reference to FIGS. 25 and 26.

Figure 25:
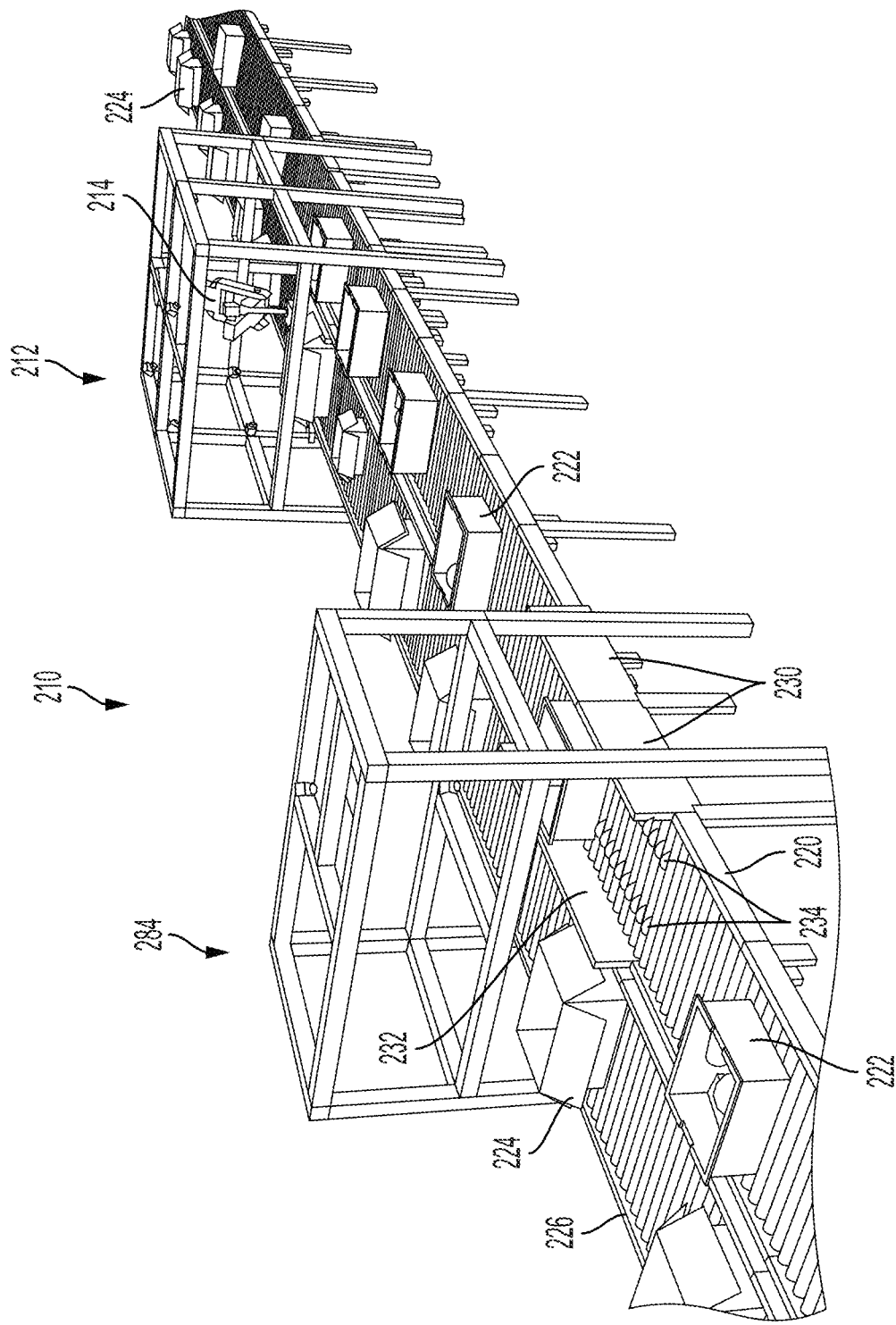
FIG. 25 shows an illustrative diagrammatic elevational view of an object processing system including a container jostling system with paddles at an inspection station in advance of an object processing station.

FIG. 25 shows, for example, a system 210 in accordance with an aspect of the present invention that includes a processing station 212 with a programmable motion device (e.g., an articulated arm) with an end effector, as well as a plurality of perception units that are directed to containers on an infeed conveyor 220 on which infeed containers (e.g., totes) 222 of objects are provided. Generally, the processing station 212 uses the end effector of the programmable motion device 214 to move objects into output containers (e.g., boxes) 224 of an output conveyor 226. The system also includes a separate container jostling station 284 (as discussed in more detail above) that includes rotatable paddles 234 as well as brace walls 230, 232. Operation of the system (including conveyors, the programmable motion device, perception units and the container jostling system) may be controlled by one or more computer processing systems.

Figure 26:
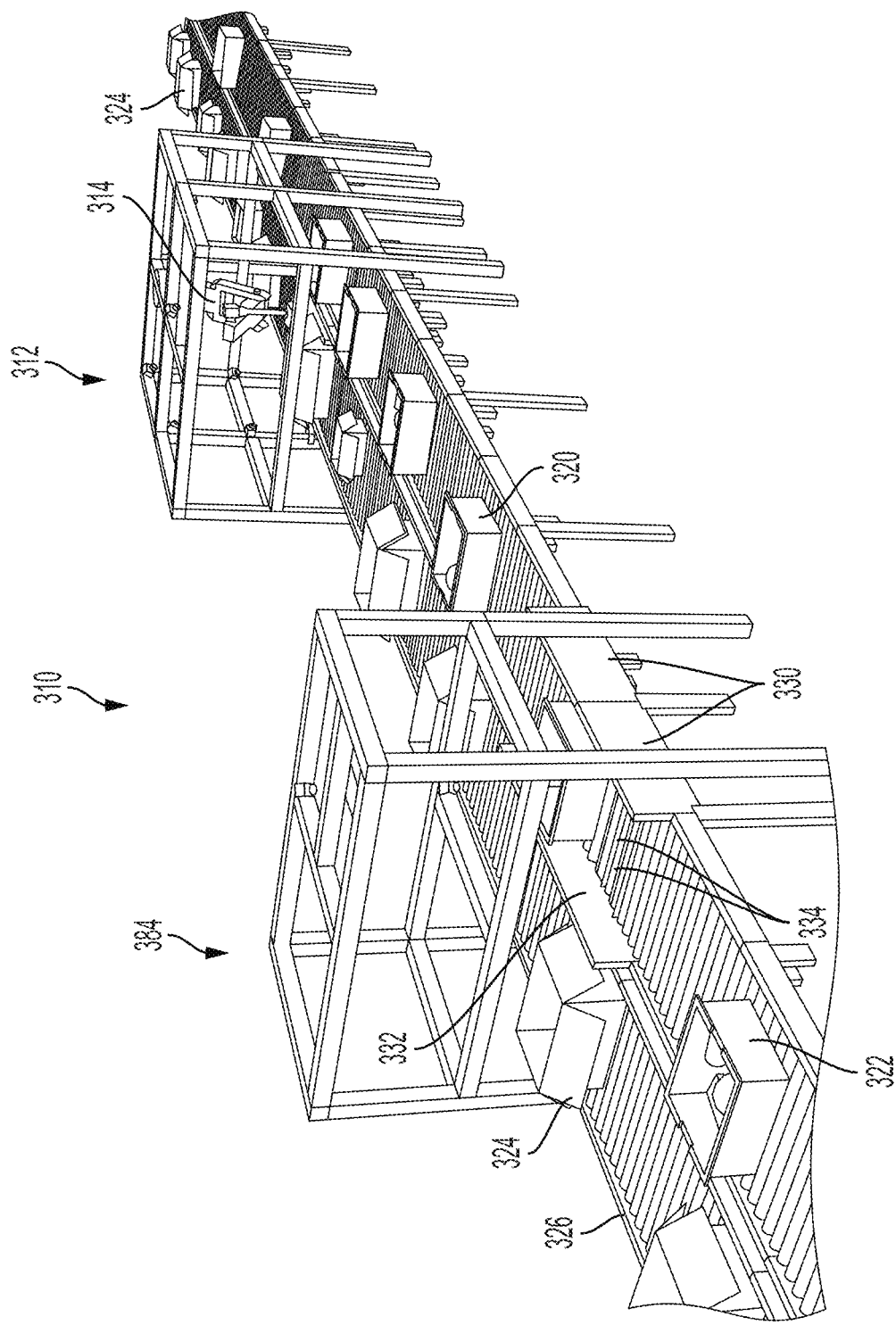
FIG. 26 shows an illustrative diagrammatic elevational view of an object processing system including a container jostling system with belts at an inspection station in advance of an object processing station.

FIG. 26 shows a system 310 in accordance with an aspect of the present invention that includes a processing station 312 with a programmable motion device 214 (e.g., an articulated arm) with an end effector, as well as a plurality of perception units that are directed to containers on an infeed conveyor 320 on which infeed containers (e.g., totes) 322 of objects are provided. Generally, the processing station 312 uses the end effector 316 of the programmable motion device 314 to move objects into output containers (e.g., boxes) 324 of an output conveyor 326. The system also includes a separate container jostling station 384 (as discussed in more detail above) that includes elevatable right angle transfer belts 334 as well as brace walls 330, 332. Operation of the system (including conveyors, the programmable motion device, perception units and the container jostling system) may be controlled by one or more computer processing systems.

Those skilled in the art will appreciate that numerous modifications and variations may be made to the above disclosed embodiments without departing from the spirit and scope of the present invention.

What is claimed is:

1. A container jostling system for jostling objects within a container, comprising:
   a conveyor that includes a plurality of rollers that are mutually spaced from one another;
   at least one container contact element that is movable vertically between at least two rollers of the conveyor and movable horizontally in a direction that is substantially parallel with the at least two rollers; and
   at least one hard stop disposed along a side of the conveyor,
   wherein the at least one container contact element lifts and laterally shifts a container containing objects moving on the conveyor such that the container impacts the at least one hard stop, and wherein the impact of the container against the at least one hard stop causes the objects within the container to shift therein.

2. The container jostling system as claimed in claim 1, wherein the jostling system includes a plurality of container contact elements that are movable vertically between at least two rollers of the conveyor, and wherein each container contact element includes a rotatable paddle.

3. The container jostling system as claimed in claim 2, wherein each rotatable paddle is round, and is mounted eccentrically on a drive shaft.

4. The container jostling system as claimed in claim 2, wherein each rotatable paddle is oval-shaped.

5. The container jostling system as claimed in claim 2, wherein the paddles are rotatable at a plurality of rotational velocities.

6. The container jostling system as claimed in claim 2, wherein the paddles are rotatable at a plurality of rotational accelerations.

7. The container jostling system as claimed in claim 2, wherein the paddles are concurrently rotatable at mutually different rotational velocities.

8. The container jostling system as claimed in claim 2, wherein the paddles are concurrently rotatable at mutually different rotational accelerations.

9. The container jostling system as claimed in claim 1, wherein the at least one container contact element includes a transverse belt that is liftable between the at least two rollers and actuatable in the direction that is substantially parallel with the at least two rollers.

10. The container jostling system as claimed in claim 1, wherein the container jostling system includes at least two container contact elements, each container contact element including a transverse belt that is liftable between the at least two rollers and actuatable in the direction that is substantially parallel with the at least two rollers.

11. The object processing system as claimed in claim 1, wherein the at least one hard stop is a brace wall.

12. The object processing system as claimed in claim 1, wherein the at least one hard stop is a side rail.

13. An object processing system comprising:
a conveyor that includes a plurality of rollers that are mutually spaced from one another;
a programmable motion device for accessing objects within a container on the conveyor;
at least one container contact element that is movable vertically between at least two rollers of the conveyor;
an actuator for moving the at least one container contact element in a direction that is substantially transverse with the direction of vertical movement; and
at least one hard stop disposed along a side of the conveyor,
wherein the at least one container contact element lifts and laterally shifts the container moving on the conveyor against the at least one hard stop, thereby causing the objects to shift within the container prior to the programmable motion device accessing any of the objects within the container.

14. The object processing system as claimed in claim 13, wherein the object processing system includes a plurality of container contact elements that are movable vertically between at least two rollers of the conveyor, and wherein each container contact element includes a rotatable paddle.

15. The object processing system as claimed in claim 14, wherein each rotatable paddle is round, and is mounted eccentrically on a drive shaft.

16. The object processing system as claimed in claim 14, wherein each rotatable paddle is oval-shaped.

17. The object processing system as claimed in claim 14, wherein the paddles are rotatable at a plurality of rotational velocities.

18. The object processing system as claimed in claim 14, wherein the paddles are rotatable at a plurality of rotational accelerations.

19. The object processing system as claimed in claim 14, wherein the paddles are concurrently rotatable at mutually different rotational velocities.

20. The object processing system as claimed in claim 14, wherein the paddles are concurrently rotatable at mutually different rotational accelerations.

21. The object processing system as claimed in claim 13, wherein the at least one container contact element includes a transverse belt that is liftable between the at least two rollers and actuatable in the direction that is substantially parallel with the at least two rollers of the conveyor.

22. The object processing system as claimed in claim 13, wherein the object processing system includes at least two container contact elements, each container contact element including a transverse belt that is liftable between the at least two rollers and actuatable in the direction that is substantially parallel with the at least two rollers of the conveyor.

23. The object processing system as claimed in claim 13, wherein the at least one hard stop is a brace wall.

24. The object processing system as claimed in claim 13, wherein the at least one hard stop is a side rail.

25. A method of jostling at least one object in a container on a conveyor, said method comprising:
moving at least one container contact element vertically between at least two rollers of the conveyor;
actuating an actuator to move the at least one contact element in a direction that is substantially transverse with the direction of vertical movement such that the at least one contact element lifts and laterally shifts a container moving on the conveyor against at least one hard stop disposed along a side of the conveyor, thereby causing objects within the container to shift therein.

26. The method as claimed in claim 25, wherein the method includes moving a plurality of container contact elements vertically between at least two portions of the conveyor, and wherein each container contact element includes a rotatable paddle.

27. The method as claimed in claim 26, wherein each rotatable paddle is round, and is mounted eccentrically on a drive shaft.

28. The method as claimed in claim 26, wherein each rotatable paddle is oval-shaped.

29. The method as claimed in claim 26, wherein the paddles are rotatable at a plurality of rotational velocities.

30. The method as claimed in claim 26, wherein the paddles are rotatable at a plurality of rotational accelerations.

31. The method as claimed in claim 26, wherein the paddles are concurrently rotatable at mutually different rotational velocities.

32. The method as claimed in claim 26, wherein the paddles are concurrently rotatable at mutually different rotational accelerations.

33. The method as claimed in claim 25, wherein the at least one container contact element includes a transverse belt that is liftable between the at least two rollers and actuatable in the direction that is substantially parallel with the at least two rollers of the conveyor.

34. The method as claimed in claim 25, wherein the method includes moving at least two container contact elements, each container contact element including a transverse belt that is liftable between the at least two rollers and actuatable in the direction that is substantially parallel with the at least two rollers of the conveyor.

35. The method as claimed in claim 25, wherein the at least one hard stop is a brace wall.

36. The method as claimed in claim 25, wherein the at least one hard stop is a side rail.

* * * * *